United States Patent [19]
Nagamitsu et al.

[11] Patent Number: 5,590,062
[45] Date of Patent: Dec. 31, 1996

[54] SIMULATOR FOR PRODUCING VARIOUS LIVING ENVIRONMENTS MAINLY FOR VISUAL PERCEPTION

[75] Inventors: Sachio Nagamitsu, Kyoto; Hisashi Kodama, Ikoma; Mayumi Sakai, Katano; Yoshihiro Hattori, Osaka; Tuneko Okada, Moriguchi, all of Japan

[73] Assignee: Matsushita Electric Industrial Co., Ltd., Osaka, Japan

[21] Appl. No.: 263,187

[22] Filed: Jun. 21, 1994

[30] Foreign Application Priority Data

| Jul. 2, 1993 | [JP] | Japan | 5-164863 |
| Jul. 8, 1993 | [JP] | Japan | 5-169325 |
| Sep. 13, 1993 | [JP] | Japan | 5-226992 |
| Jun. 21, 1994 | [JP] | Japan | 6-138502 |

[51] Int. Cl.$^6$ ............................................. G06F 17/00
[52] U.S. Cl. ............................. 364/578; 395/326; 345/8
[58] Field of Search ......................... 364/578, 410; 395/126, 140, 156, 159; 345/8, 122; 434/72, 365, 307 R; 273/85 R, 85 G, 437, 438, 434

[56] References Cited

U.S. PATENT DOCUMENTS

| 5,255,211 | 10/1993 | Redmond | 364/578 |
| 5,293,529 | 3/1994 | Yoshimura et al. | 345/158 |
| 5,296,871 | 3/1994 | Paley | 345/163 |
| 5,297,061 | 3/1994 | Dementhon et al. | 364/559 |
| 5,320,538 | 6/1994 | Baum | 434/307 |
| 5,329,276 | 7/1994 | Hirabayashi | 340/870.31 |
| 5,381,158 | 1/1995 | Takahara et al. | 345/156 |
| 5,442,734 | 8/1995 | Murakami et al. | 395/127 |
| 5,453,758 | 9/1995 | Sato | 345/158 |

FOREIGN PATENT DOCUMENTS 4192066   7/1992   Japan .

OTHER PUBLICATIONS

"The Virtual Dimension", by C. Davidson, Image Processing 1991, pp. 10–14, London GB.
"The Electronic Library Manager's Guide to Virtual Reality", by D. Raitt, The Electronic Library, vol. 9, No. 1, Feb. 1991, New York/USA.
Arielle Emmett, Down to Earth, Mar. 1992, Computer Graphics World vol. 15, No. 3, p. 46–47.
Honda et al., Multivariate Data Representation and Analysis by Face Pattern Using Facial Expression Characteristics, 1986, Pattern Recognition, vol. 19, No. 1, pp. 85–94.
Herman Chernoff, The Use of Faces to Represent Points in K–Dimensional Space Graphically, Journal of the American Statistical Association, Jun. 1973, vol. 68, No. 342.

*Primary Examiner*—Michael Zanelli
*Attorney, Agent, or Firm*—Price, Gess & Ubell

[57] ABSTRACT

The present invention provides a simulator which is easy to manipulate, and with which a user can experience a realistic simulation in various 3-D spaces, or a designer can understand physical environment conditions with the spaces intuitively or analyze mutual affects when there are a plurality of people in the spaces. The simulator comprises an input manipulation unit that the user can manipulate with one hand, a soft-robot display unit for displaying a soft-robot in accordance with the physical environment conditions, and a soft-robots display unit for producing a plurality of soft-robots.

58 Claims, 26 Drawing Sheets

SIMULATOR FOR PRODUCING VARIOUS LIVING ENVIRONMENTS MAINLY FOR VISUAL PERCEPTION

BACKGROUND OF THE INVENTION

(1) Field of the Invention

The present invention relates to a simulator, and more particularly, to a simulator with which one predicts and confirms various living environments mainly by visual perception and further by auditory perception when planning a house.

(2) Description of the Related Art

Today, requests for houses vary from individual to individual depending on a house one wants. On the other hand, housing equipment such as an air conditioner has rapidly advanced and the performance has been upgraded. In particular, a so-called housing-air-conditioner (an air conditioner furnished with a house as one unit) has spread widely. In this case, the housing equipment must be selected at the time of planning. Further, there has been an increasing need to fully consider lighting environments created by the location of a TV set and a desk beside windows, lighting equipment, etc.

On the other hand, people are highly amenity-oriented these days (amenity means comfort given by places, air-conditioning, visual perception, etc). For this reason, there has been a need for a housing plan that fully utilizes a limited space to quickly provide satisfactory living environments in which an internal space looks excellent and residents feel good and comfortable both mentally and physically.

These are important not only when building new houses but also when repairing houses.

Also, these issues have become important for places where a plurality of people work in or use such as shops, offices, etc.

However, it is expensive to employ a conventional experimental method using a miniature to plan optimal individual houses to satisfy various requests form users or owners, particularly in Europe, America, and Japan where laboring costs are high. Further, it is difficult, in practice, to respond quickly to their requests. Given these circumstances, a computer technology which has rapidly advanced in recent years has been adopted to perform an evaluation on 3-D (three-dimensional) living environments by producing virtual living environments. This enables a quick, inexpensive evaluation on the air-conditioning, lighting, sound, etc. This is so-called a computer simulation. Moreover, the simulator enables one to easily experience a simulation in a realistic way by producing a virtual space called a virtual reality using the simulation result. Thus, a massive amount of analysis data necessary at the time of planning can be collected efficiently. The simulation is considered to be used to a proposed-type sales technique; and users such as customers (residents-to-be) or a sales man experience a simulation of housing environments prior to construction. This is important, particularly, in a case where houses of a same standard, such as condominiums, ready-built houses, and office buildings, are mass-produced for sale. Conventionally, the simulation results are displayed on a CRT (cathode-ray-tube) or domed display in two-dimension, or displayed in three dimension through a stereoscopic parallax using a pair of stereoscopic glasses to evaluate the performance a house would exhibit when it is completed. In this case, the cost performances of the simulator is upgraded due to the advancement of hardware. For example, as is shown in FIG. 1, the simulator comprises a goggle-type stereoscopic display unit 11, a computation control unit 13, and a 3-D input unit 12, and one can experience a realistic simulation to observe how the internal of a virtual, stereoscopic room produced in the goggle-type stereoscopic display unit changes by changing an angle or a location. Note that the goggle-type stereoscopic display unit 11 includes two compact image forming devices for each eye, and an image of a device or the like formed for both eyes is displayed in accordance with not only a distance (longer the distance, smaller the image, but also a certain parallax to each eye. Accordingly, a stereoscopic, perspective image as if seen through the real eyes in real environments can be produced. Also, a menu or the like can be displayed when it is necessary. Further, a so-called data glove, such as the one shown in FIG. 1, is generally used as the 3-D input unit 12 since both eyes are covered with the goggle-type stereoscopic display unit 11. The data glove 12 is a glove made of cloth embedded with a considerable amount of expandable/contractible wavy or spiral metal strips: when one moves his hand or fingers for a switching manipulation or similar movement, the content of the movement can be detected by the expansion or contraction of the above-mentioned metal strips. Commands entered into the simulator corresponding to the movements of the hand or fingers have been determined in advance, and thus, various commands can be entered by the movements of the hand or fingers, making a simulation within the virtual space possible. Further, equipped at the top of a monitor's head is a magnetism detecting point 15 for three directions: up-and-down, right-and-left, and front-and-read. The magnetism detecting pointer 15 detects the change of the strength in three directions in a magnetic field generated by a magnetic-field generating unit 14 to detect an inclination of the head to reflect the same in a view field within the virtual space produced in the goggle-type stereoscopic display unit. The magnetism is used herein because the detection by light is susceptible to interior illumination and the detection by sound is susceptible to outside noise.

A method as follows is adopted as a necessary means for stereoscopic display: the locations or geometry of devices, a house, walls, windows, etc. are defined by 3-D coordinates by giving an x-coordinate to the east-and-west direction, a y-coordinate to the north-and-south direction, and a z-coordinate to the up-and-down direction, and z-h to a height to the eyes to calculate the parallax or visible geometry or sizes. Numeral 1300 in FIG. 1 shows a conception of input geometry or the like.

If one changes his location with putting the simulator on, he can experience how the visual and auditory perception change to some extent. In this case, the change in location is detected based on the detection of a magnetic field generated by the magnetism generating unit 14 by the magnetism detecting pointer 15 which requires less number of detecting pointers and simple structure and is independent of sound and light.

According to the above construction, not only the devices installed in the room, but also thermal environments or lighting environments by illumination can be displayed stereoscopic as shown in FIGS. 2A, 2B. In FIG. 2A, numeral 22 shows air circulation produced by an air-conditioner 21 and numeral 23 shows contour lines of a temperature-distribution analytic index. In FIG. 2B, numeral 25 shows contour lines indicating an illuminance distribution produced by the illumination by a chandelier 24. FIG, 2C shows a monitor experiencing auditory environments by a stereo-headphone 26.

Rules and facts necessary for calculations of the aforementioned are as follows:

(1) A solid angle of a device in a view field is inversely proportional to a square of a distance from the eyes.

(2) The parallax of both eyes is inversely proportional to the distance.

(3) The luminous energy from a light source and volume from a sound source are inversely proportional to a square of the distance.

(4) The directivity, the contents of frequencies, etc. of light or sound from lighting devices or the sound source respectively, the change of a reflection factor depending on an incident angle at a reflecting surface, an absorption factor by the devices and an attenuation factor by air or glasses of light or sound, etc. will be fixed once conditions are given.

(5) Likewise, a specific heat and viscosity of air, an amount of radiation heat from a heat source, and heat properties of each device or the like will be fixed once conditions are given.

(6) Various analytic equations such as Euler's equation and successive equations.

Note that these are not the gist of the present invention, and described in the textbooks of mathematics, drawings and physics. An application where sound is also reflected on a 3-D visual display, or a program technique that displays a menu for program selection instead of an object such as a house are known arts and described "ARTIFICIAL REALITY" Myron Krueger, Addison-Wesley, Inc., etc. Also, various equations or analytic methods including an interpolation, a numerical differentiation and integration, a calculus of finite difference, a transition matrix method, and a finite element method are also well known arts. Thus, the explanation thereof is omitted.

However, to select a subject such as a building and room or environment elements to be evaluated from a menu with the conventional 3-D input unit 12 of the data glove, the data glove 12 must be moved to where it can hold the menu drawn within a 3-D space. Thus, one must move his arms while keeping his balance with putting the goggle-type stereoscopic display unit 11 on his eyes. In addition, one must remember rules to enter the commands by the movement of fingers, which are rarely adopted, Thus, the manipulation efficiency is considerably low. This is important for a designer unfamiliar with the simulator or a customer wishing to experience a simulation in sales engineering.

Also, to select furnishings in a room (stationary devices such as walls or windows), or equipment to be relocated (non-stationary devices such as the lighting devices, air-conditioner, and washing machine), the one must move one place to another within the virtual space. Hence, one must walk around with the goggle-type stereoscopic display unit 11 on. However, the magnetic field used to detect the location of the goggle-type stereoscopic display unit 11 covers a radius of 2 m at most. If one must move beyond 2 m, a method such that designates a walking-movement by a previously determined move command from the data glove 12 must be adopted. For example, one must move towards a direction that a displayed finger designates. If the number of subjects of the simulations is to be increased, it is necessary to increase the rules to be remembered, which does not provide an optimal man-to-machine interface. Also, since the data glove 12 is not used often, it becomes complicated and expensive.

To evaluate the simulation result of the living environments as planning data, observation methods in which a monitor moves to a location subject to evaluation within the virtual space, or physical amounts such as illuminance are displayed by contour lines on a cross-section of the virtual space must be employed.

However, it is not preferably to walk around with one's eyes covered with the goggle-type stereoscopic display unit 11 even within a room. Thus, the observation may result unsatisfactory because one pays attention to his walking-movement.

In particular, it is not impossible but difficult for a construction company or a sales company to let the end user, or namely residents-to-be or buyers-to-be, experience a satisfactory simulation of the environments of a house subject to construction or sale.

Also, it is difficult to observe sensible temperatures or winds associated with changes of one's location, which are indispensable in selecting or placing the air conditioner or the like. However, this is absolutely necessary not only for the general housing but also for shops.

Information of the wind, temperature, light, sound, etc. for either the entire room or a cross section can be collected; however, information at a specific location, which are indispensable when planning a comfortable living space, can not be collected easily.

Also, although it is often that a number of people exist in one room of individual houses or the shops, the simulation neither considers this situation nor mutual affects. Also, the planning data and experiences as to the behavior or mutual affects or effects of a number of people both under general circumstances and at emergency can not be collected. However, this is important for the housing, shops, etc.

In addition, the lighting affects on the house and devices installed therein are not displayed accurately; moreover, an intensity is not displayed effectively, thereby making it difficult to evaluate a sense of shade and shadow.

When one sees the outside form the inside and vice verse, only external or internal walls are visible. Thus, it is difficult to evaluate the individual house or interior of the entire room in relation with the external of the room or individual house. This is critical for a house with a garden or a restaurant with a garden the customers would appreciate.

Although affects by outside noise associated with the opening or closing of the windows are important in the cities, it is difficult to evaluate these affects intuitively.

If one is not familiar with the simulator, he may walk out of the room because of incorrect manipulations, and it is not easy to find his current location to walk back to the room.

In addition, although the designer can imagine the changes in various housing environments due to the changes of planning conditions, but has difficulty in understanding the changes intuitively. This is important for an inexperienced designer. Besides, it is inconvenient to collect intuitive planning data.

In the sales engineering, it is difficult to let the customers experience a simulation associated with the changes of the environment conditions such as internal luminosity produced by on and off of the lighting, opening and closing of the windows, etc. quickly and intuitively to satisfy their various requests.

Also, although evaluations on the location of mirrors, the color of the show window and illumination or the like are indispensable for the shops, it is difficult to experience the aforementioned quickly and intuitively.

For these reasons, there is an increasing need for a 3-D input unit and a goggle-type stereoscopic display unit that can realize the evaluation of the living environments with a satisfactory man-to-machine interface.

SUMMARY OF THE INVENTION

The present invention has an object to solve the problems caused by the conventional simulator.

Accordingly, the present invention has a primary object to provide a simulator for producing the living environments mainly for visual perception and additionally by auditory perception as well as by sound, which is inexpensive, easy to manipulate, and excellent in contents of simulations. More precisely, the present invention has the following objects.

The present invention has an object to provide a simulator for producing the living environments mainly for visual perception and additionally by sound using less number of rules to be remembered for manipulations to select or replace devices, equipment or the like installed in a room.

The present invention has an object to provide a simulator for producing various living environments including individual houses, shops, offices, etc. mainly for visual perception.

The present invention has an object to provide a simulator for producing the living environments mainly for visual perception, which enables one to sense a temperature, wind, comfort, etc. he would feel at a specific location associated with the change of his location within the room in relation with other people.

The present invention has an object to provide a simulator for producing the living environments mainly for visual and auditory perception with a consideration of a plurality of people being in the room and their mutual affects.

The present invention has an object to provide a visual intuitive simulator for producing the living environments mainly for visual perception with a consideration of a relation with and affects of the internal and external of the room.

The present invention has an object to provide a simulator for producing the living environments mainly for visual perception, and with which a customer and a house designer can experience changes caused by the replacement of the devices besides various senses, and obtain various planning data quickly and intuitively in the sales engineering.

The present invention has an object to provide a simulator for producing the living environments in the sales engineering mainly for visual perception, which can be operated by the movements similar to manual manipulations without any danger and difficulty, and with which one can correct manipulation errors easily, and hence which is effective in the sales engineering.

The present invention has an object to provide a simulator for producing the living environments mainly for visual perception, which is effective to be intuitive in educating house designers and collecting technical data.

The present invention has an object to provide a simulator for producing the living environments mainly for visual perception, which is applicable not only to individual houses but also to the shops and offices or the like.

The present invention has an object to provide an inexpensive simulator for producing the living environments mainly for visual perception.

The present invention has an object to provide a visual simulator fully effective for sound in the living environments.

The above objects can be fulfilled by a simulator for producing an environment for simulation visually in accordance with a user's manipulation, the simulator comprising: a stereoscopic viewing unit to be put on the user's eyes; an input unit for inputting necessary data to produce a plurality of environments subject to visual simulation prior to a simulation; a storage unit for storing data inputted by the input unit; a menu generating unit for generating a menu used for selecting one environment that the user would like to experience among the plurality of environments within a view field of the stereoscopic viewing unit; a menu selecting unit for selecting the one environment form the menu by a movement of the user's one hand; and a stereoscopic environment producing unit for producing the one environment stereoscopically in the stereoscopic viewing unit by taking out corresponding data form the storage unit to enable the user to experience a simulation of the one environment.

The menu selecting unit may include: a beam emitting unit for emitting a beam in the stereoscopic viewing unit to select the one environment from the menu, the beam being used when the user designates the one environment in the menu by changing a direction of the beam by a movement of the user's one hand; and a beam-based menu selecting unit for effecting a selection of the one environment designated by the beam for a simulation.

The simulator may further comprise: a user's movement inputting-manipulating unit for inputting and manipulating data related to a movement of the user, the user being assumed to be in the one environment; a user's movement reflecting unit for adding amendments to the one environment in association with a movement of the user based on input data from the user's movement inputting-manipulating unit and data related to the one environment stored in the storage unit.

The user's movement inputting-manipulating unit may include: a detecting unit for detecting at least one of an manipulation causing a magnetic change, a manipulation causing an acceleration, a button pushing manipulation, and a switching manipulation by a movement of the user's one hand; and a first converting unit for converting a content detected by the detecting unit into an input related to the user's movement within the one environment.

The first converting unit may include: a second converting unit for converting a detection result by the detecting unit into at least one of a walking-movement and a head-turning-movement of the user assumed to be in the one environment, and the user's movement reflecting unit may include: a view field amending unit for amending a change in the view field caused in association with at least one of the user's walking-movement and head-turning-movement based on a converting result by the second converting unit.

The first converting unit may include: a third converting unit for converting a detection result by the detecting unit into a manipulation of the user that changes at least one of a lighting environment condition and a scene within the view field, the lighting environment condition corresponding to at least one of a light source, a partition, a reflecting surface, a transmitting surface, and a device within the one environment, and the user's movement reflecting unit may include: a lighting environment condition amending unit for amending at least one of an illuminance, a color, a location of the device, a display of the device, and a partition within the view field associated with the manipulation of the user that changes at least one of the lighting environment condition and luminous energy based on a converting result by the third converting unit.

The first converting unit may include: a fourth converting unit for converting a detection result by the detecting unit into a manipulation of the user related to at least one of turning-off, turning-on of the device, a change of existence of the partition within the view field, the manipulation affecting at least one of a sound environment, a thermal environment, an air-circulation environment within the one environment, and the user's movement reflecting unit may include: a sound, thermal, air-circulation condition amending unit for amending at least one of an illuminance, a color, a location of the device, a display of the device, turning-off and turning-on of the device, existence of a partition associated with the manipulation of the user based on a converting result by the fourth converting unit.

The user's movement inputting-manipulating unit may include: a sound input unit for accepting the user's sound input; and a sound input converting unit for converting the accepted user's sound input into an input related to the user's movement within the environments.

The above object can be also fulfilled by a simulator for producing an environment for simulation visually in accordance with a user's manipulation, the simulator comprising: a stereoscopic viewing unit to be put on the user's eyes; an input unit for inputting necessary data to produce an environment subject to visual simulation prior to a simulation; a storage unit for storing data inputted by the input unit; a stereoscopic environment producing unit for producing an environment in the stereoscopic viewing unit based data stored in the storage unit; a soft-robot producing unit for producing a soft-robot within the environment; a soft-robot's location designating unit for enabling the user to designate and amend a location of the soft-robot within the environment; a physical condition data input unit for inputting data necessary to determine a physical condition within the environment, the physical condition data corresponding to data stored in the storage unit; a physical condition data storage unit for storing the data inputted by the physical condition data input unit; a physical condition data calculating-storing unit for calculating a value representing the physical condition data related to a location of the soft-robot within the environment designated by the soft-robot's location designating unit using at least a part of the physical condition data stored in the physical condition data storage unit to store a calculation result; a soft-robot display rule input unit for inputting a rule that regulates a relation between the value and a soft-robot display manner prior to producing of the soft-robot; a soft-robot display rule storage unit for storing the rule inputted by the soft-robot display rule input unit; a soft-robot display manner determining unit for determining a soft-robot display manner based on a calculation result stored in the physical condition data calculating-storing unit and the rule stored in the soft-robot display rule storage unit; and a soft-robot display manner control unit for controlling the stereoscopic viewing unit to display the soft-robot in accordance with a manner determined by the soft-robot display manner determining unit by synthesizing the soft-robot and the environment.

The simulator may further comprise: a physical condition data change manipulating unit for enabling user to change at least a part of data stored in the physical condition data storage unit used for a calculation of the physical condition data at a location of the soft-robot into at lest one of other data and new input data; and a physical condition data change manipulation effecting unit for effecting, when the user effects the change using the physical condition data change manipulating unit, an amending operation necessary for a calculation, determination, synthesis and display associated with the change to the physical condition data storing unit, the soft-robot display manner determining unit, and the soft-robot display manner control unit.

The above objects can be also fulfilled by a simulator for producing an environment for simulation visually in accordance with a user's manipulation, the simulator comprising: a stereoscopic viewing unit to be put on the user's eyes; an input unit for inputting necessary data to produce an environment subject to visual simulation prior to a simulation; a storage unit for storing data inputted by the input unit; a stereoscopic environment producing unit for producing the environment in the stereoscopic viewing unit based data stored in the storage unit; a symbol producing unit for producing a symbol within the environment, the symbol indicating a value representing a physical condition within the environment visually; a symbol's location designating unit for enabling the user to designate and change location of the symbol within the environment; a physical condition data input unit for inputting data necessary to determine the physical condition within the environment, the physical condition data corresponding to data stored in the storage unit; a physical condition data storage unit for storing input data from the physical condition data input unit; a physical condition data calculating-storing unit for calculating the value representing physical condition at a location of the symbol designated by the symbol location designating unit using at least a part of data stored in the physical condition data storage unit to store a calculation result; a symbol display rule input unit for inputting a rule that determines a relation between the value representing the physical condition at the symbol's designated location and a display manner; a symbol display rule storage unit for storing the rule inputted by the symbol display rule input unit; a symbol display manner determining unit for determining a display manner of the symbol based on the calculation result stored in the physical condition data calculating-storing unit and the rule stored in the symbol display rule storage unit; and a symbol display manner control unit for displaying the symbol in a manner determined by the symbol display manner determining unit by synthesizing the symbol and the one environment.

The simulator way further comprise: a physical condition data change manipulating unit for changing at least a part of data used for a calculation of the physical condition at the symbol's location within the environment into at least one of other data and newly input data, the part of data being stored in the physical condition data storing unit; and a physical condition data change manipulation effecting unit for effecting, when the user effects the change using the physical condition data change manipulating unit, an amendment operation necessary for a calculation, determination, synthesis, and display in accordance with the change to the physical condition data calculating-storing unit, the symbol display manner determine display, and the symbol display manner control unit.

The above objects can be also fulfilled by a simulator for producing an environment for simulation visually in accordance with a user's manipulation, the simulator comprising: a stereoscopic viewing unit to be put on the user's eyes; an input unit for inputting necessary data to produce an environment subject to visual simulation prior to a simulation; a storage unit for storing data inputted by the input unit; a user's location input manipulating unit for enabling the user to designate and amend the user's location within the environment; a stereoscopic environment producing unit for producing the environment within the stereoscopic viewing unit in accordance with a location of the user inputted by the user's location input manipulating unit based on data stored in the storage unit; a boundary recognizing unit for recognizing a boundary of the environment based on data stored in the storage unit; an outside-boundary-user recognizing unit for recognizing a current location of the user based on an input by the user's location input manipulating unit to detect a case when the user walks out of the environment based on the boundary, and for subsequently finding a relation between a latest location of the user within the environment and a current location outside of the environment; and an outside-boundary-user guiding unit for producing information, upon a receipt of a notice of the relation from the outside-boundary-user recognizing unit, related to the relation in the stereoscopic viewing unit by referring to data stored in the storage unit.

The above objects can be also fulfilled by a simulator for producing an environment for simulation visually in accordance with a user's manipulation, the simulator comprising: a stereoscopic viewing unit to be put on the user's eyes; an input unit for inputting necessary data to produce an environment subject to visual simulation prior to a simulation; a storage unit for storing data inputted by the input unit; a stereoscopic environment producing unit for producing the environment in the stereoscopic viewing unit based data stored in the storage unit; a physical condition data input unit for inputting data necessary to determine a physical condition within the environment, the physical condition data corresponding to data stored in the storage unit; a physical condition data storage unit for storing the physical condition data inputted from the physical condition data input unit; a physical condition distribution calculating-storing unit for calculating a distribution of the physical condition based on data inputted from the physical condition data input unit to store a calculation result; a virtual plain setting manipulating unit for setting at least one virtual plain within the environment at a command from the user; and a contour line map drawing unit for drawing a contour line map of the physical condition data within the one environment on the virtual plain based on the physical condition distribution, and for synthesizing the contour line map and the environment to display a result in the stereoscopic viewing unit.

The above objects can be also fulfilled by a simulator for producing an environment for simulation visually in accordance with a user's manipulation, the simulator comprising: a stereoscopic viewing unit to be put on the user's eyes; an input unit or inputting necessary data to produce an environment subject to visual simulation prior to a simulation; a storage unit for storing data inputted by the input unit; a selective lighting condition numerical data input unit for inputting numerical data related to at least one of an illuminance of lighting for each primary color, a transmission factor of a glass surface for each primary color, and a reflection factor of a mirror to evaluate lighting environment condition data, the numerical data being selected by the user, the lighting environment condition data corresponding to data stored in the storage unit; a selective lighting condition numerical data storage unit for storing the numerical data inputted by the selective lighting condition data input unit; a selection manipulating unit for enabling the user to select necessary data for a lighting environment evaluation from the numerical data stored in the selective lighting condition numerical data storage unit; and a stereoscopic environment producing-storing unit for producing the lighting environment condition data based on the data stored in the storage unit and the numerical data selected by the selection manipulating unit to store the lighting environment condition data and to be displayed in the stereoscopic viewing unit.

The above objects can be also fulfilled by a simulator for producing an environment for simulation visually for a plurality of users in accordance with heir manipulations, the simulator comprising: a stereoscopic viewing unit to be put on each user's eyes; an input unit for inputting necessary data to produce an environment subject to visual simulation prior to a simulation; a storage unit for storing data inputted by the input unit; an each user's location designating unit for enabling each user to designate and amend their own locations within the environment; an individual user's environment producing unit for producing a view field of the environment determined by data stored in the storage unit and each user's location within their respective stereoscopic viewing unit; a user's location recognizing unit for recognizing a location of each user experiencing the simulation based on input from the individual user's location designating unit; and an other users' soft-robots producing unit for producing soft-robots corresponding to other users respectively at their respective locations based on a recognition result by the user's location recognition unit within the environment.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

First Embodiment

Figure 1:
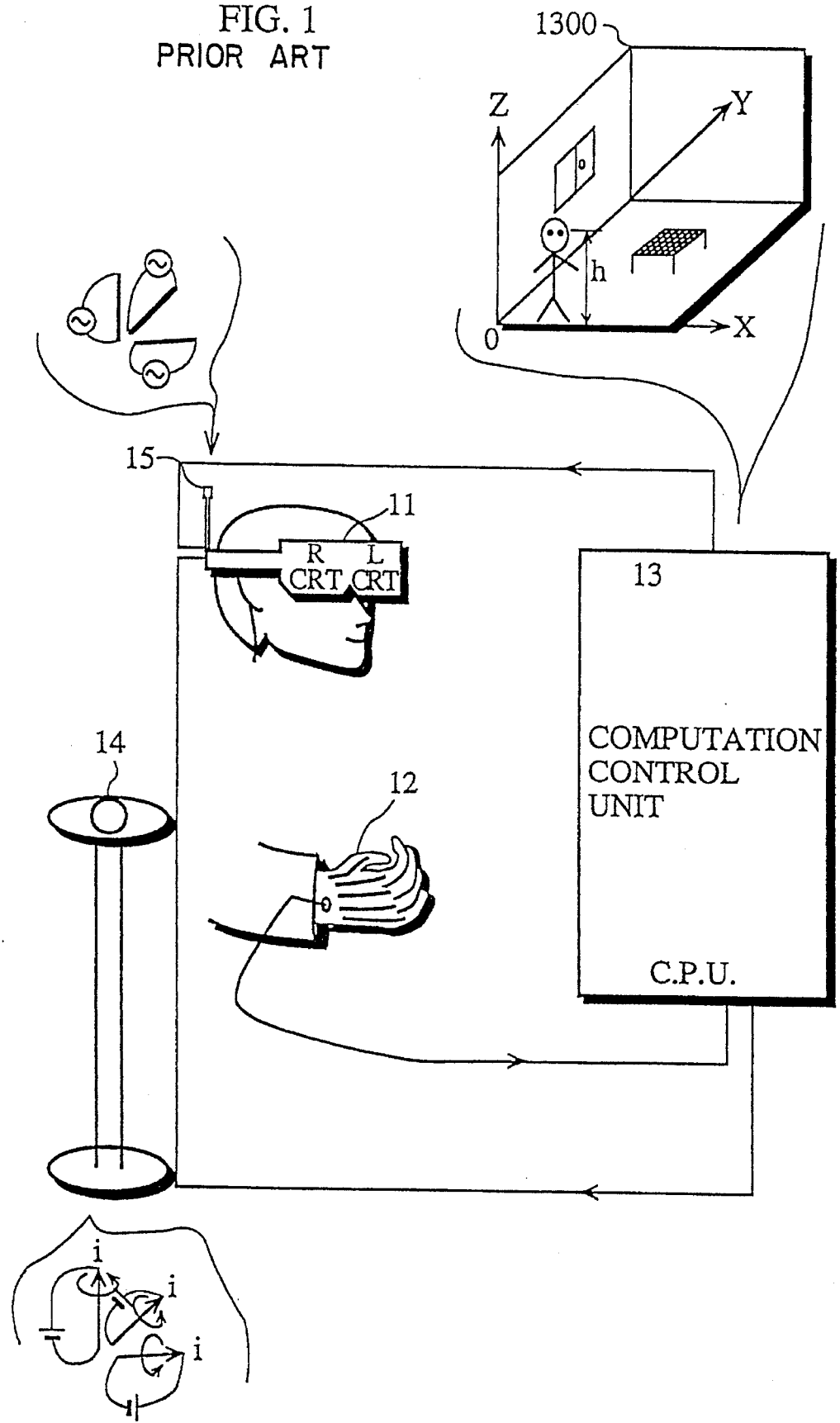
FIG. 1 is a schematic view showing a structure of a conventional housing environments simulator.

In the following, an embodiment of the present invention will be explained with referring to the drawings.

Figure 3:
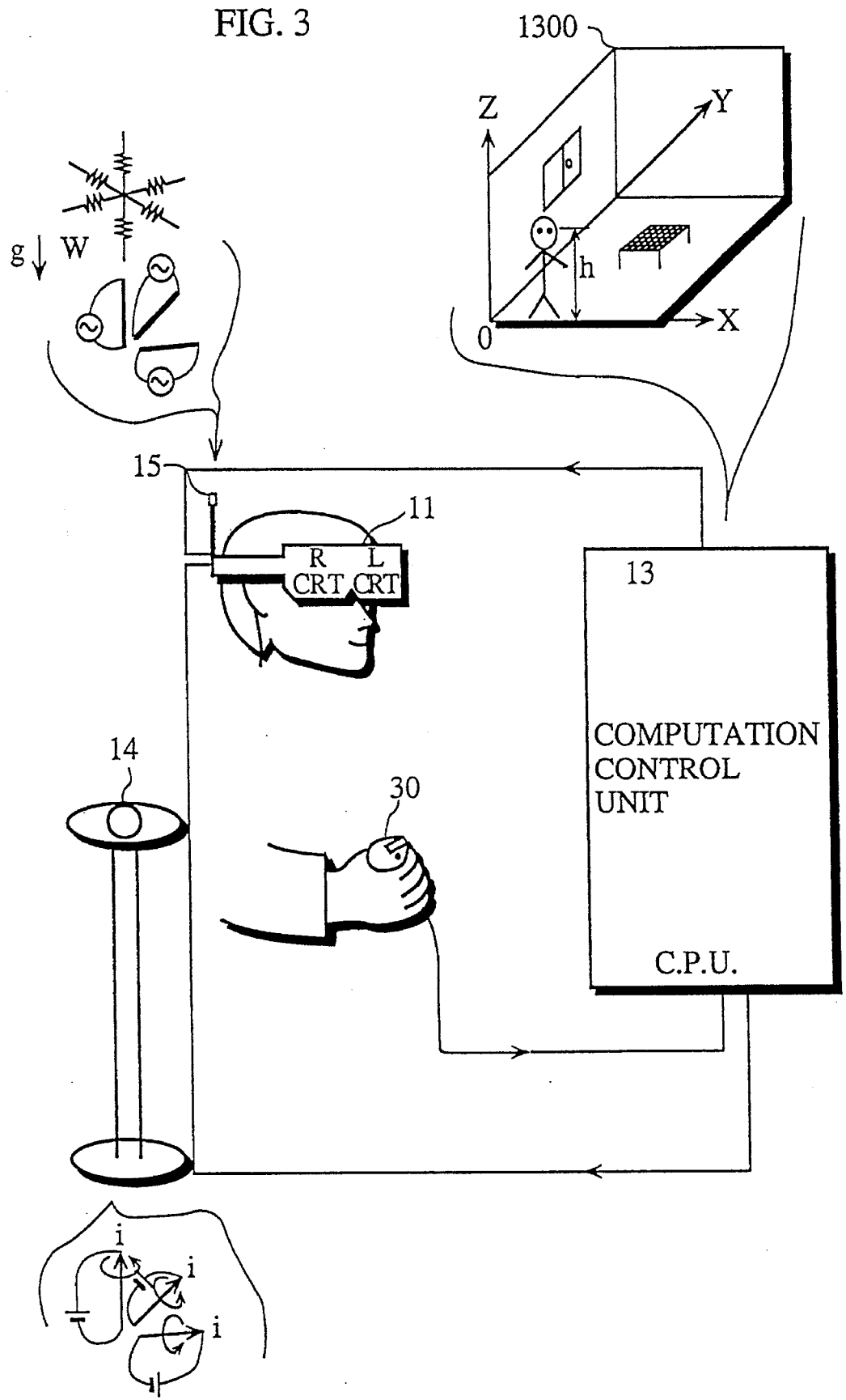
FIG. 3 is a schematic view showing a structure of a simulator in accordance with a first embodiment of the present invention.

FIG. 3 is a schematic view showing a structure of a simulator in accordance with the first embodiment of the present invention.

FIG. 3 is identical with FIG. 1 except that the data glove 12 is replaced with a 3-D input unit 30, or a so-called 3-D mouse. In FIG. 3, a signal that a monitor inputs by the 3-D input unit 30 while watching the goggle-type stereoscopic display unit 11 is outputted to the goggle-type stereoscopic display unit 11 again via the computation control unit 13.

Figure 4:
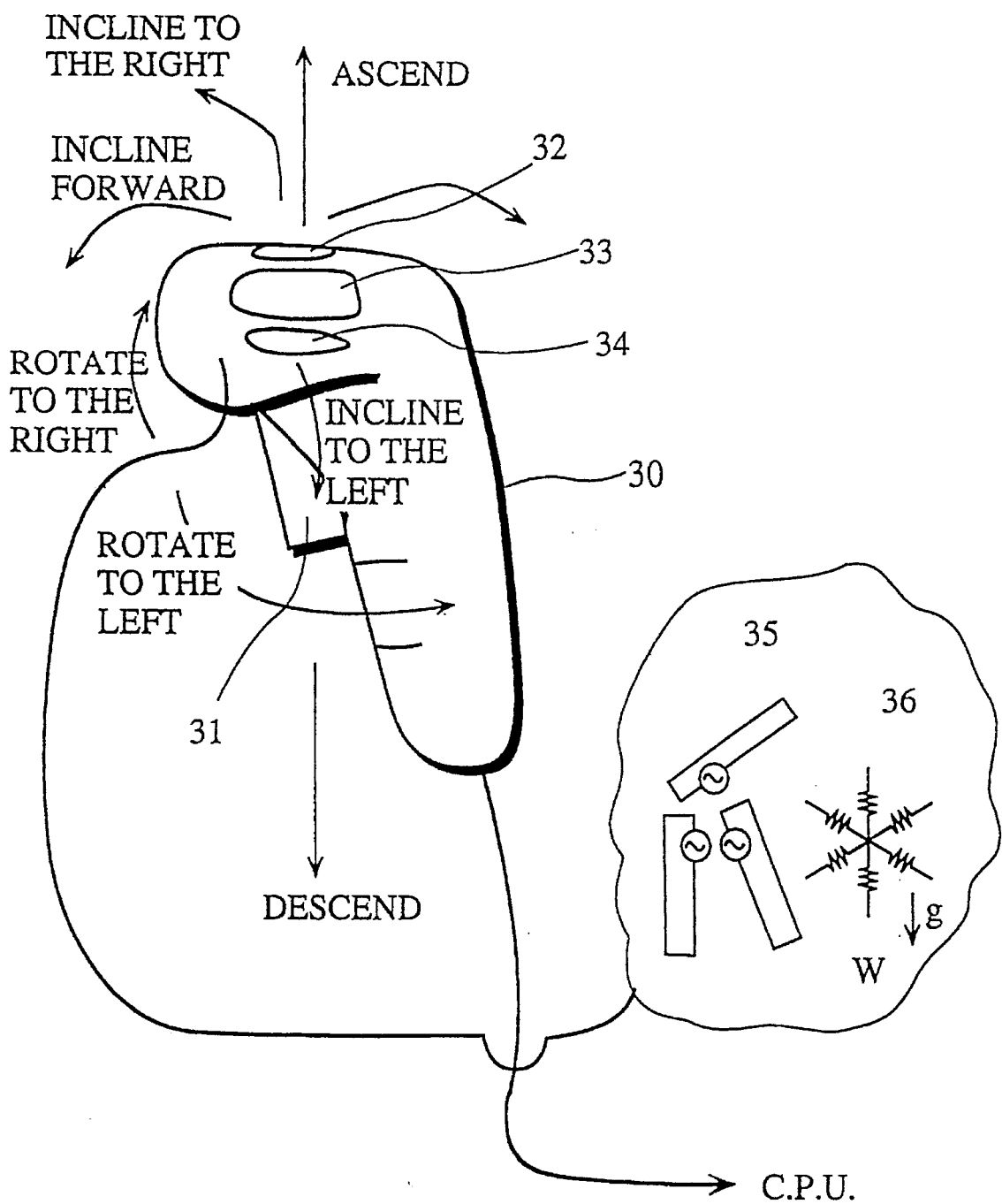
FIG. 4 is a view showing an outward appearance and operation instructions for a 3-D input unit 30 for a menu selection in the first embodiment.

FIG. 4 is a view showing an enlarged outward appearance of the 3-D input unit 30 of this embodiment to explain the operation and manipulation thereof. The 3-D input unit 30 is of a configuration similar to a grip of a pistol; a trigger switch 31 is furnished at a trigger and a right button 32, a central button 33, and a left button 34 are furnished on the top. These switch and buttons or the like are used for specific purposes, which will be described later. Also, a magnetism detecting pointer 35 and an accelerometer 36 are installed therein for each direction in 3-D; up-and-down, left-and-right, and front-and-rear. By comparing the strengths of the three directions in the magnetic field detected by the magnetism detecting pointer 35 and detecting an direction of the gravity and acceleration by the accelerometer 36, the changes of rotational angles, movements, or acceleration of the 3-D input unit 30 with respect to the magnetic field indicated by arrows in FIG. 4 can be detected. Further, the 3-D input unit 30 is used for specific purposes by switching depending on the simulation contents, which will be explained in another embodiment.

Figure 5:
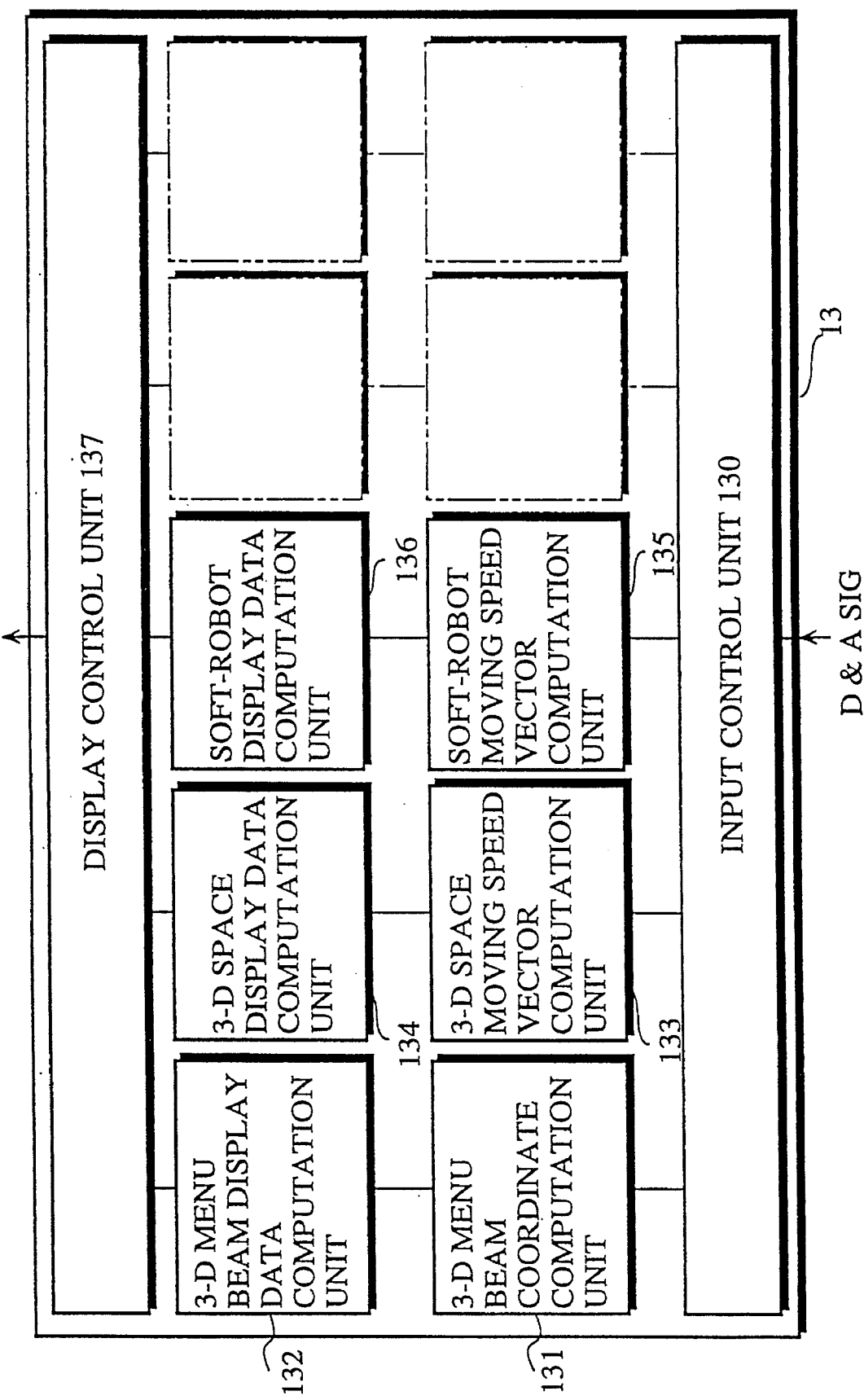
FIG. 5 is a view showing an internal structure of a computation control unit 13 in the first embodiment.

FIG. 5 shows an internal structure of the computation control unit 13. A signal inputted through the 3-D input unit 30 by a user using the goggle-type stereoscopic display unit 11 enters into an input control unit 130. An analog signal for a rotation angle or the like is converted into a digital signal. Of course, signals from the switch and buttons are directly inputted. Further, the signals are sent to each computation unit to be processed depending on the contents. In other words, if information relates to a manipulation to select a menu for a building, a room, environment elements drawn in the goggle-type stereoscopic display unit 11 or to a manipulation of semi-infinitely long 3-D beams to be used for the above menu selection, the signals are sent to a 3-D menu-3-D beam coordinate computation unit 131 and a 3-D menu-3-D beam display data computation unit 132; if the information relates to the walk-through within a room, the signals are sent to a 3-D space moving speed vector computation unit 133 and a 3-D space display data computation unit 134; further, if a soft-robot will be formed within a view field of the goggle-type stereoscopic display unit 11 to be operated, the signals are sent to a soft-robot moving speed vector computation unit 135 and a soft-robot display data computation unit 136.

Other than the above, the signals are sent to other processing units or computation units depending on manipulations, and each of which will be explained where necessary. All of these signals are sent to a display control unit 137 in the end. The signals are converted into electric signals necessary to generate and display a given video in the goggle-type stereoscopic display unit 11 depending on the contents of the manipulation, and further sent to the goggle-type stereoscopic display unit 11 again.

Other than the above components, the 3-D input unit 30 also includes: an input unit and a memory for the geometry and locations of houses, devices installed in the room, and lighting devices subject to simulation or selection thereof, and physical properties such as the reflection factor of each point; another memory for a program for performing mesh-division and computations necessary for the analysis of the aforementioned; an input manipulation unit for manual input by a user, etc. These components will be described in other embodiments where necessary. Certain environment conditions have been precisely or roughly computed or analyzed to be stored to enable a quick response, and a memory for this purpose is additionally included, which will be also described in another embodiment where necessary.

In the following, the operation and effects will be described specifically with referring to the drawings.

In the first place, the menu selection will be explained with referring in FIG. 6.

Figure 6:
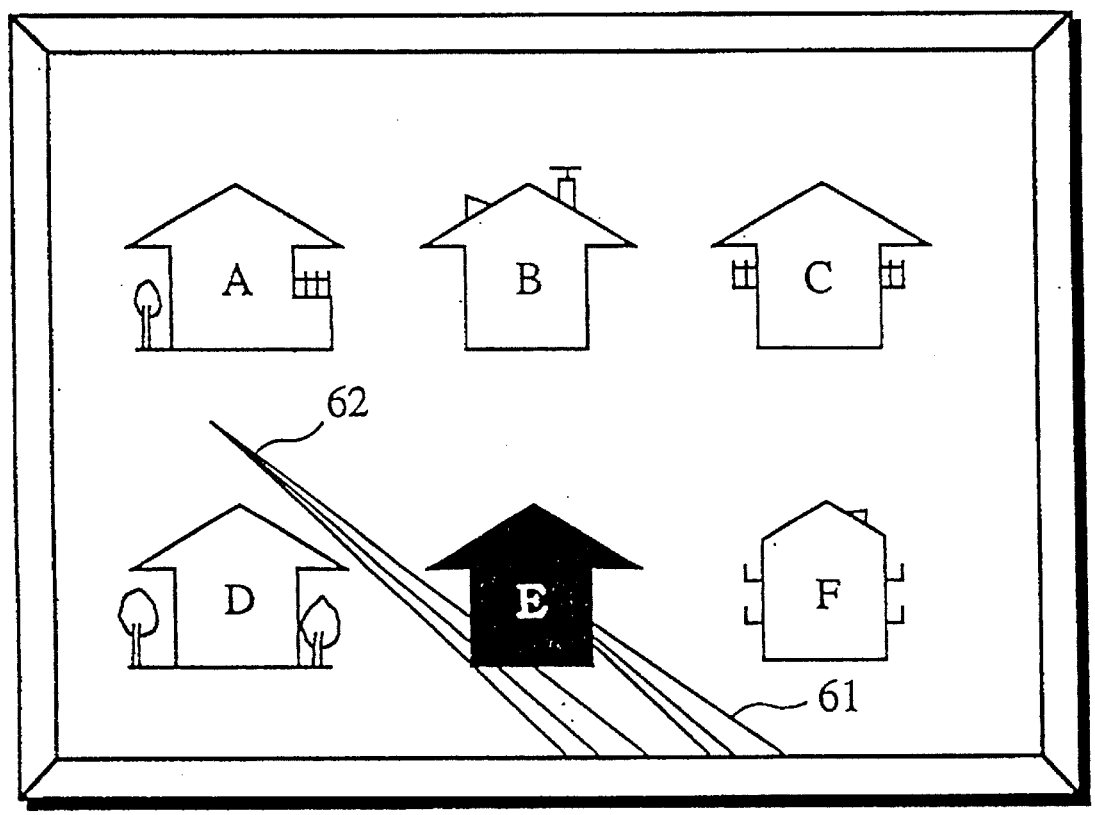
FIG. 6 is a view showing a 3-D menu and 3-D beams for the menu selection in the first embodiment.

In FIG. 6, a 3-D menu drawn in a space produced by the goggle-type stereoscopic display unit 11 is shown. In FIG. 6, prospective houses for selecting a house whose internal environments are subject to simulation are displayed on a screen. A user selects one of six houses in the form of icons using the 3-D input unit 30, with which he would like to experience a simulation. Besides the houses, semi-infinitely long 3-D beams 61, 62 are drawn on the screen to be used for the selection. The 3-D beams 61, 62 varies their directions or the like in response to the manipulations of the movements, rotation and inclination of the 3-D input unit 30, and irradiating the same to any of the displayed houses enables the selection of the house that the user would like to experience the simulation with.

To be more specific, prior to the walk-through within the room, the 3-D menu is displayed by a push of the central button 33 of the 3-D beam unit 30 to irradiate the drawn 3-D beam 61 on the 3-D icon of the house that one would like to experience the simulation with, then a confirmation command is entered with the trigger switch 31. According to the above, the selected housing environments are displayed virtually. Thus, the user neither has to change his location nor manipulate a data glove 12.

Next, the contents of the computation by the 3-D menu·3-D beam coordinate computation unit 131 and 3-D menu·3-D beam display data computation unit 132 in the above case will be explained.

In this embodiment, the 3-D beams 61, 62 are shown as semi-infinitely long bars having the 3-D input unit 30 as a starting point. The central coordinate of the cross section is fixed by a 3-D polar coordinate for a display or the like. For this reason, the intersection with the icon displayed on a 3-D virtual space expressed by the mutually orthogonal coordinates of three directions can be found easily by a simple calculation using an angle of the 3-D input unit 30 to the magnetic field after the origins of the both coordinates are added and the coordinate axes are adjusted. If the confirmation command is entered under these circumstances, the icon corresponding to the angle of the 3-D input unit 30 to the magnetic field is selected.

For this reason, the menu can be selected as if one were pointing a specific good displayed at a shop by a baton or finger.

Note that the selection manipulation with the 3-D input 30 held in hand of the user also makes it possible to fix the starting point of the 3-D beam at the center of the user's eyes. Accordingly, the menu can be selected as if one were selecting (indicating) the goods or the like that caught his eyes at the shops while turning his head from the left to the right and vice versa.

These operations are performed by the rotation manipulation of the user's wrist holding the 3-D input unit 30 or the head and the pushing of the buttons by a finger. For this reason, not only the user does not have to remember the complicated manipulations but also the manipulation is similar to one's natural movements. Hence, it is easy to learn how to use the simulator. Moreover, it is not necessary to keep a balance with one's eyes covered with the goggle-type stereoscopic display unit 11.

Note that the selection by the 3-D beams can be applied to the selection of any environment elements besides the buildings that one would like to evaluate, such as the selection of the type of the air conditioners and turning on or off of the air conditioner. Also, it can be applied to the selection or change of a partial environment conditions as per user's request, such as the change of placement, replacement, and turning off or on of the devices coming into his view as he walks through the room.

Second Embodiment

Another embodiment of the present invention will be explained with referring to the drawings.

The second embodiment relates to a way of experiencing the simulation and a simulation method, or namely walk-through under the housing environments selected in the first embodiment. Thus, the basic structure or the like is identical with the first embodiment. Hence, the explanation of the like components will be omitted and only the structure and operation inherent to this embodiment will be explained.

The walk-through referred herein means that the user looks around the room virtually produced and turning off or on the devices equipped therein, so that he can experience a simulation of the environments such as rooms, illumination, sound as if they were real. In the following, a process of the walk-through will be explained.

Figure 7:
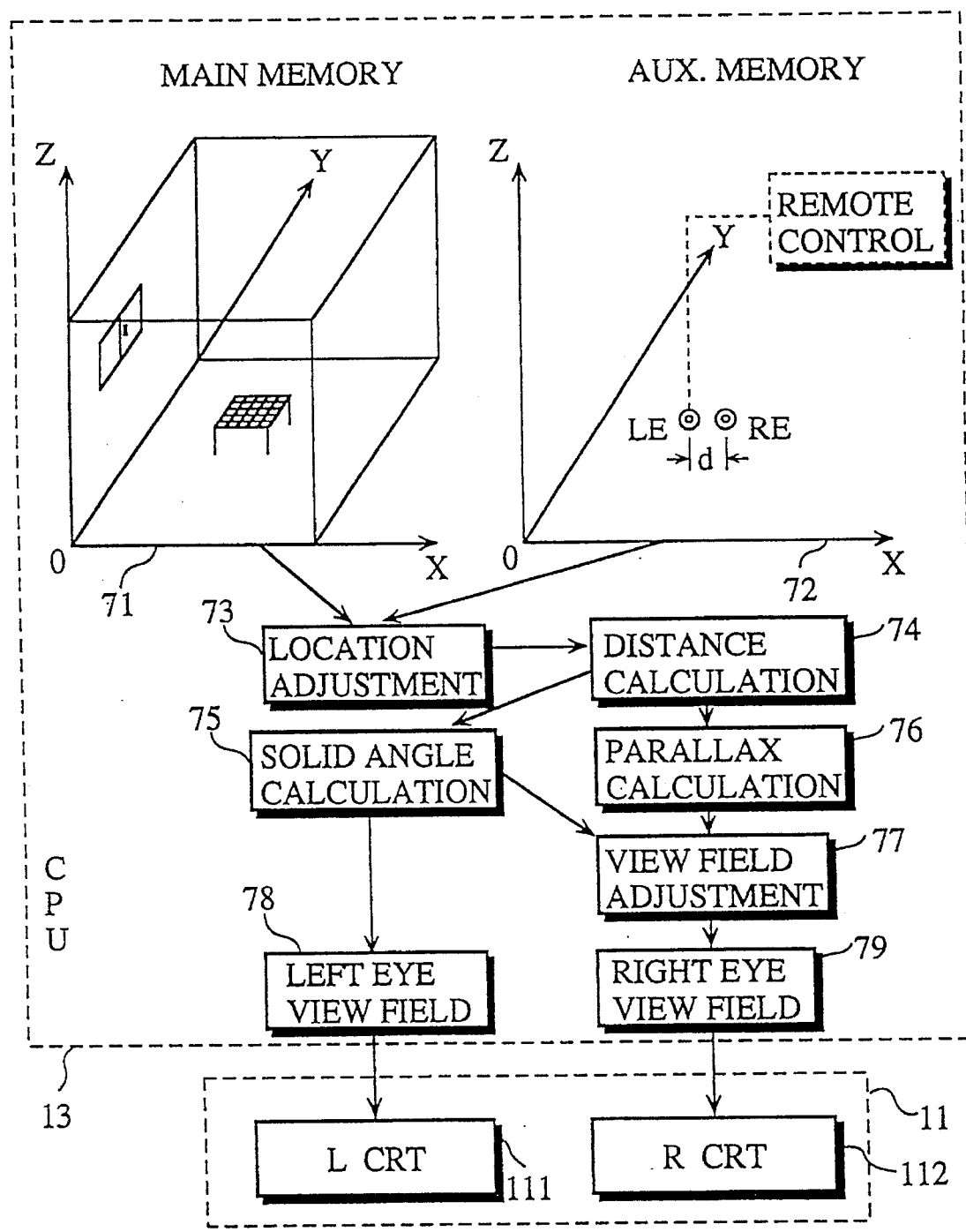
FIG. 7 is a view showing a process for producing stereoscopic visual environments associated with a monitor's walk-through in a second embodiment.

FIG. 7 is a view showing 3-D visual information processing in this embodiment. In FIG. 7, numeral 13 is the computation control unit and numeral 11 is the goggle-type stereoscopic display unit. As is denoted by numeral 71, the housing environments have been inputted into a main memory for virtual-environment display by the 3-D coordinates in advance. Also, assume that the user's dominant eye is the left eye, then as is denoted by numeral 72, the user's eyes are inputted into the 3-D coordinates in an auxiliary memory in the same direction and measurement using the left eye as a standard. The location and eye ray direction or the like are manipulated by the 3-D input unit 30. In other words, by inclining the 3-D beam unit 30 called the 3-D mouse in each direction as shown in FIG. 4, the rotation angle information is inputted into the 3-D space moving speed vector computation unit 133 via the input control unit 130 in the computation control unit 13, and a moving speed and a direction of the walk-through and hence the location of the eyes from the starting point are calculated depending on the degrees and direction of the rotation angle.

Next, a location adjustment 72 is done by producing the housing environments seen through the left eye by matching the origins of the coordinates and coordinate axis liens of both the memories.

A distance calculation 74 calculates a distance of each point within the room from the left eye. Subsequently, a solid angle calculation 75 of each device or the like installed in the house is performed. Also, a parallax calculation 76 is performed for each point within the room based on the distance calculation result of a distance d between the eyes and a distance to the devices or the like. A view-field adjustment 77 is performed by generating a view field seen through the right eye based on the results of the solid angle and parallax calculations. Accordingly, the calculation result of the sold angle is directly outputted as a left view field 78, and the result of the view-field adjustment is outputted as a right view field 79, which are further sent to an LCRT 111 and a RCRT 112 in the goggle-type stereoscopic display unit 11 respectively, so that a stereoscopic display associated with the change of one's location is realized.

In addition, each process is mainly performed by the 3-D space display data computation unit 134 and 3-D space moving speed vector computation unit 133.

Here, illuminance or the like at each point within the room is irrespective of the existence of the user and coordinates of the location except for a case where there are a plurality of people or the like. For this reason, the illuminance or the like at each point within the room has been calculated in advance to be used for the display corresponding to the user's view field.

Figure 8A:
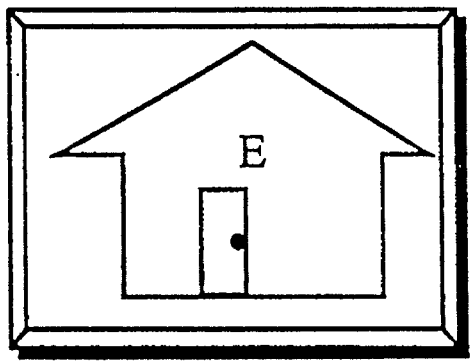
FIGS. 8A–8D are views showing a room and the external thereof displayed during walk-through within the room in the second embodiment.

Next, how the view field changes when the user walks through within the virtual house with the simulator constructed as above will be shown. FIGS. 8A, 8B, 8C, and 8D show this. FIG. 8A shows an outward appearance of the house selected for simulation from the menu drawn in the goggle-type stereoscopic display unit 11, and a door can be seen in the front.

Figure 8B:
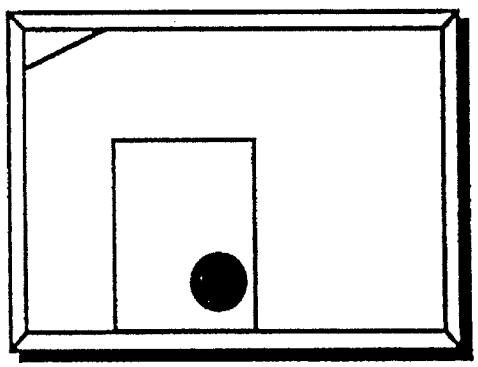
Figure 8C:
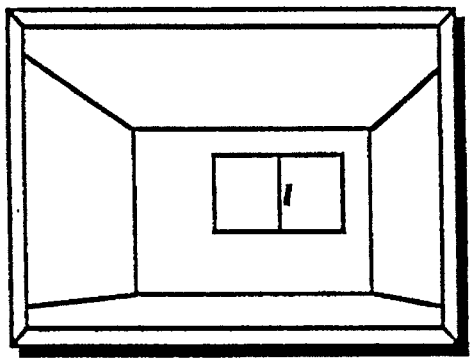
Figure 8D:
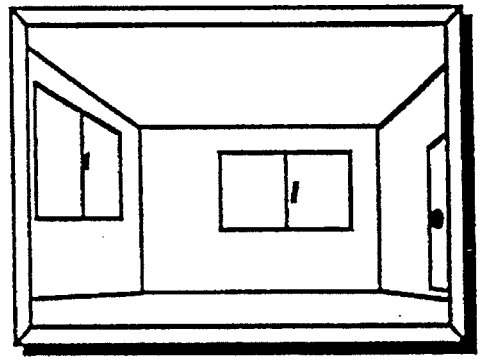

FIG. 8B shows a situation where the user approaches to the door by inclining the 3-D input unit 30 forward. FIG. 8C shows a situation where the user enters into the room through the door, and a window on an opposing wall can be seen. Subsequently, the user rotates the 3-D input unit 30 to the right by twisting his wrist to the right, so that the user changes his direction easily to see the door on his right and the window on his left.

Of course, by moving the 3-D input unit 30 up and down, a close-up display of the vicinity of the ceiling or the floor can be seen. Also, in this embodiment, the input manipulation can be performed by the magnetism detecting pointer 15 placed on the user's head instead of the input manipulation by the rotation angle using the 3-D input unit 30 held in hand. Note that to distinct from a selection mode of the above mentioned 3-D menu, the manipulation of the 3-D input unit 30 may be performed by keeping the trigger switch 31 pressed down.

For the above reasons, the user can manipulate the simulator naturally as if he were using a joy stick of a TV game or a control stick of a helicopter.

In this embodiment, the user's moving speed can be changed by the absolute value or degrees of the inclination or rotation angle of the 3-D input unit 30; however, the explanation thereof is omitted as an applied principle is simple.

Third Embodiment

Another embodiment of the present invention will be explained with referring to the drawing. Like the second embodiment, this embodiment also uses the structure of the first embodiment. For this reason, the explanation of the like components in the first embodiment is omitted.

Figure 2A:
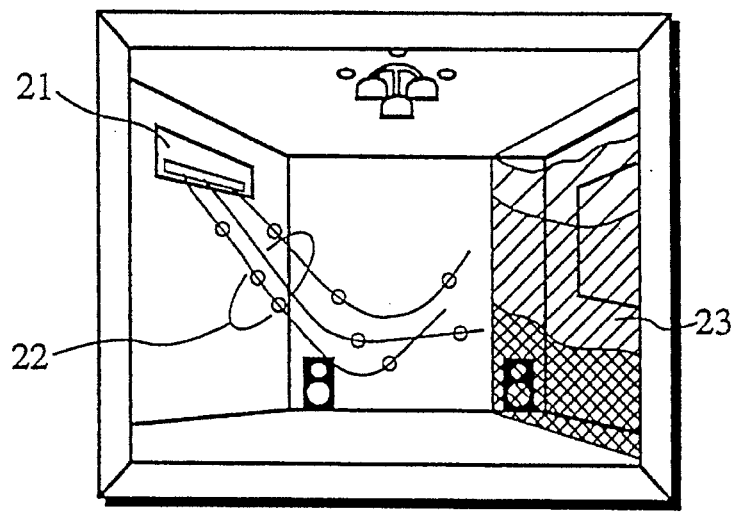
FIG. 2A is a view showing a display example of the analysis result of thermal environments.
Figure 2B:
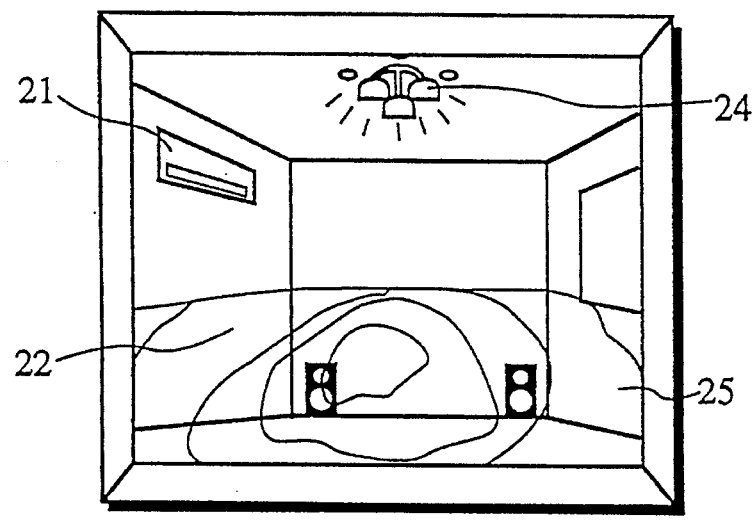
FIG. 2B is a view showing a display example of the analysis result of light environments.
Figure 2C:
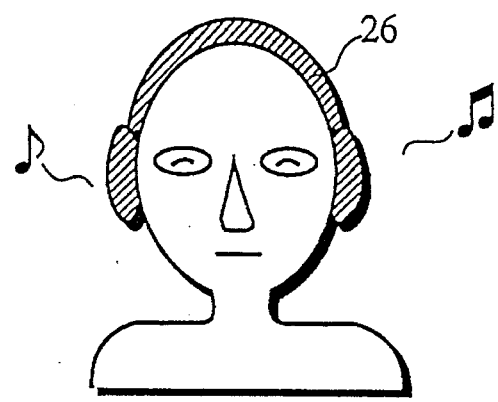
FIG. 2C is a view showing the analysis result of sound environments being outputted.

In the sales engineering for general users, particularly for the customers such as the residents-to-be or the buyers-to-be, the confirmation of the atmosphere created by the illumination or the appearance of the room during the walk-through are most important. However, when a house designer or an equipment designer uses the simulator of the present invention, it is necessary to display detailed, visualized physical phenomenon. Further, in case of buildings used for business such as coffee shops, movie theaters, dance halls, how the users feel about the internal equipment, lighting devices, etc. and what affects they will bring about on the users are the prime concern for the mangers of the coffee shops or the like. For this reason, as a means to show a massive amount of 3-D data as the result of the numerical value simulation in a specific manner, a method for drawing a virtual cross section of the room to display the temperature distribution by the contour lines thereon as shown in FIG. 2A, or a method so-called "particle path display" (trances of the particles are shown in different ways) for visualizing a wind speed by dispersing particles within the room as shown in FIG. 2B have been adopted. Also, as for a means to obtain the values of a detailed evaluation at a specific location, there is a method to move the 3-D input unit 30 to a concerned location assuming the 3-D input unit 30 as a virtual sensor to calculate the temperature or the like at that location to display the same, or to display values which have been calculated in advance as virtually measured values. However, it is difficult to understand intuitively and see how people actually feel the temperature or the like, ow how these values change in relation with people or the location.

In this embodiment, a soft-robot 90 shown in FIG. 9 is used as the solution of this problem.

The soft-robot 90 is a virtual human as an observer's or namely user's alter ego or a third party, which can visually express the temperature or the like one would feel. In this embodiment, the soft-robot 90 is produced in the internal space, so that the designer or the like can visually observe the environments this virtual human feels to solve the above problem. To be more specific, the soft-robot 90 walks through the room entirely for the user, and the soft-robot 90 changes colors in each portion in response to the physical values of the environmental conditions or the change thereof caused by the change of its location or the turning-off or turning-on of the devices. By so doing, not only the physical values such as the room temperature or the wind speed at its current location, but also the distribution of the effective temperature, a temperature with a consideration of wind affects, and the air capacity or wind direction can be displayed by changing the swaying of the hair or the expression. As a result, an efficient, objective, and visual evaluation can be realized in relation with the people. Further in this case, by displaying the effective temperature or air capacity on each portion of the robot, the result will be not only realistic but also effective. This is important when discussing the placement of tables or air conditioner or the like in the coffee shops.

In the following, the change of the soft-robot 90's location within the room, which is the basis of this embodiment, will be briefly explained.

Figure 9A:
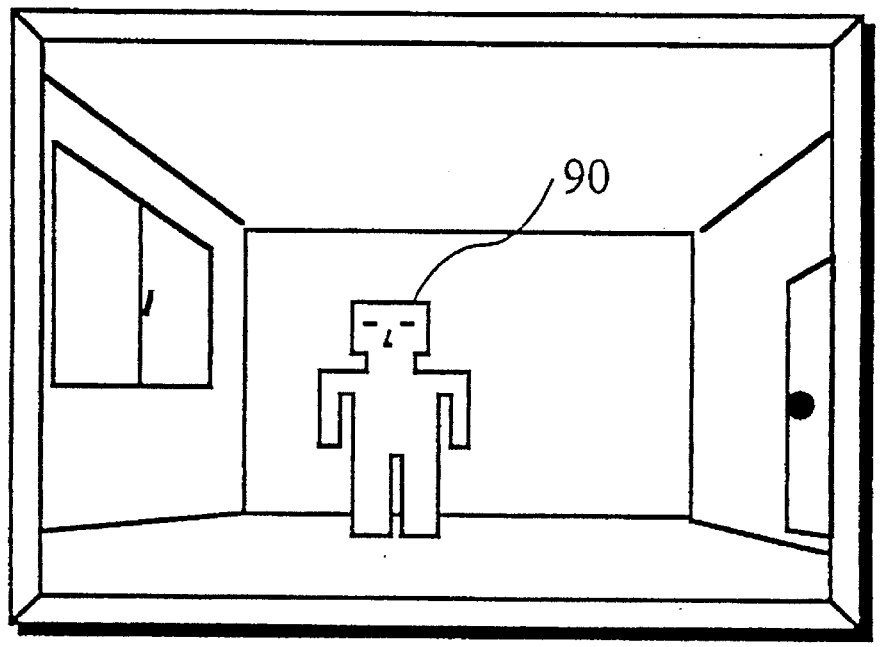
FIGS. 9A and 9B are views showing display examples when a soft-robot of a third embodiment walks around in the room.
Figure 9B:
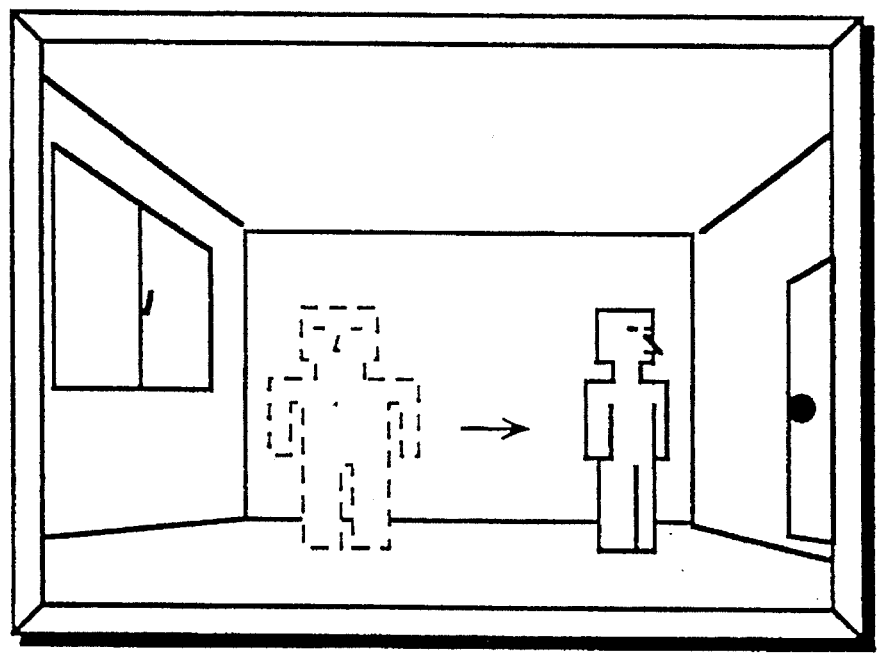

The situation where the soft-robot 90 changes its location within the room is displayed in FIGS. 9A and 9B. The manipulation is substantially the same as the aforementioned walk-through by the user, and for this reason, this is done by the 3-D input unit 30. Further, the moving direction of the soft-robot 90 is judged based on either the eye-ray direction of the user or soft-robot depending on the selection of the user. Also, the soft-robot moving speed vector computation unit 135 and soft-robot display data computation unit 136 perform processing necessary for various displays associated with the change of the soft-robot's location.

More specific explanation will be given in the following.

Figure 10:
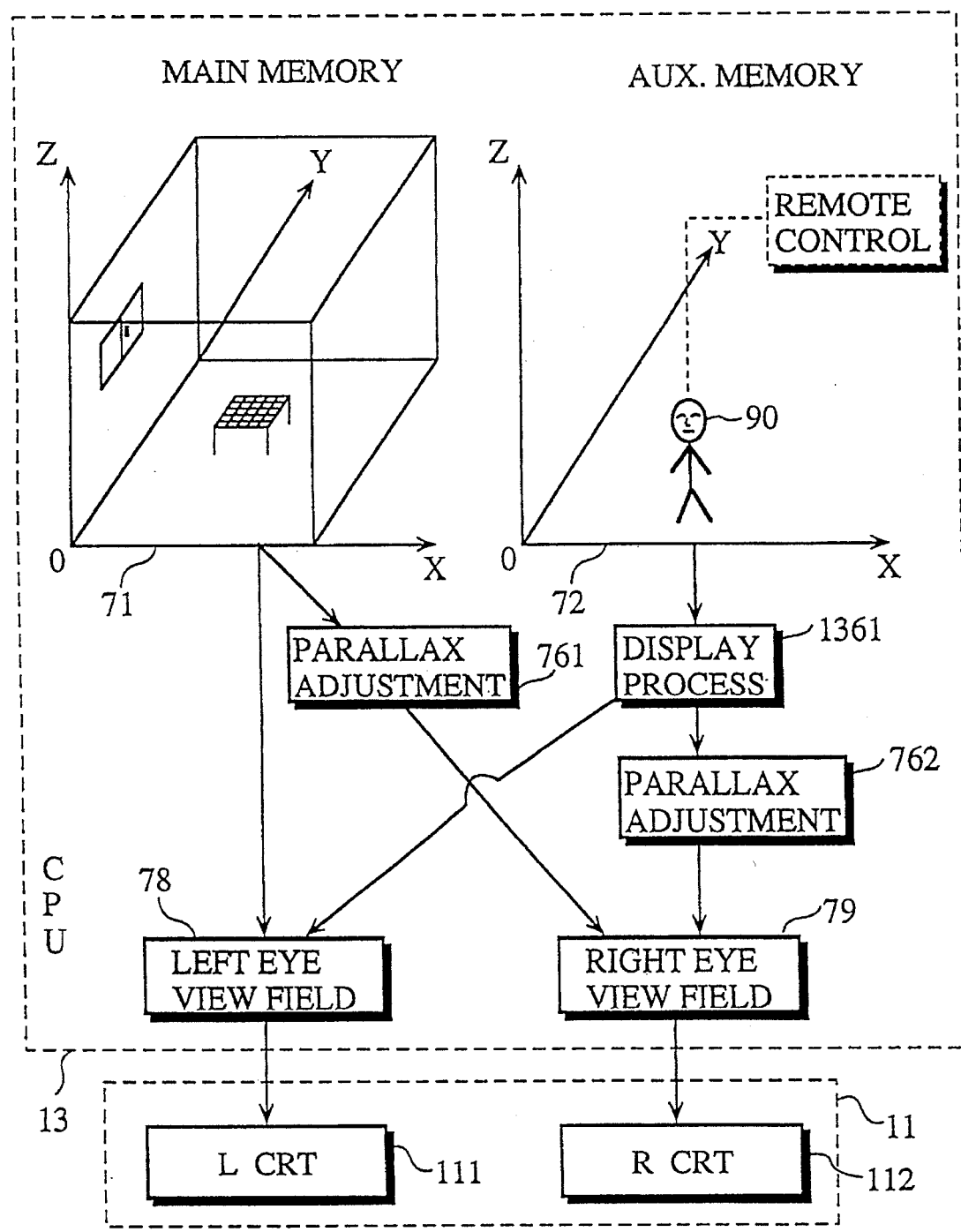
FIG. 10 is a view explaining a process for visual information associated with the change of the soft-robot's location in the third embodiment.

FIG. 10 shows processing of visual information associated with the walk-through by the soft-robot 90 of this embodiment. In FIG. 10, numeral 13 is the computation control unit and numeral 11 is the goggle-type stereoscopic display unit 11.

The housing environments denoted as numeral 71 have been produced in the main memory for virtual environments display using the 3-D coordinates in advance. As to visual environments, what is stored in the main memory is used directly as the view field 78 for the left eye, and used as the view field 79 for the right eye after a parallax adjustment of the environments 761. On the other hand, as is shown by numeral 72, the location of the soft-robot 90 form the base point is generated in the auxiliary memory with the 3-D coordinates by placing the left eye in the center. A visual signal relative to the soft-robot 90 is inputted into and outputted from a display process 1361, and used for the view field 78 of the left eye directly, and used for the vie field 79 of the right eye via a parallax adjustment process of the soft robot 762. Subsequently, the visual signals for left and right eyes are respectively sent to the CRT 111 for the left eye and the CRT 111 for the right eye to produce the stereoscopic environments.

Note that the changes of the soft-robot's and user's location are distinguished by the switching of the buttons of the 3-D input unit 30 shown in FIG. 4, but another method such as replacing the 3-D input unit with another 3-D input unit used for this purpose only may be adopted. Also, the goggle-type stereoscopic display unit 11 or 3-D input unit 30 may incorporate a microphone, so that a verbal instruction can be inputted. In this case, words used as input instruction such as "go" or "stop" are relatively short and the number thereof is limited. Hence it is easy to recognize the verbal instructions and the explanation thereof is omitted.

Only if the environments within the room are to be simulated visually through walk-through by the soft-robot 90, only the outline of the soft-robot 90 may be displayed in bold.

Next, the structure and operation necessary to display the physical conditions of the environments at a concerned location in the room by changing the expression and colors of the soft-robot will be explained with referring to the drawings.

Figure 11:
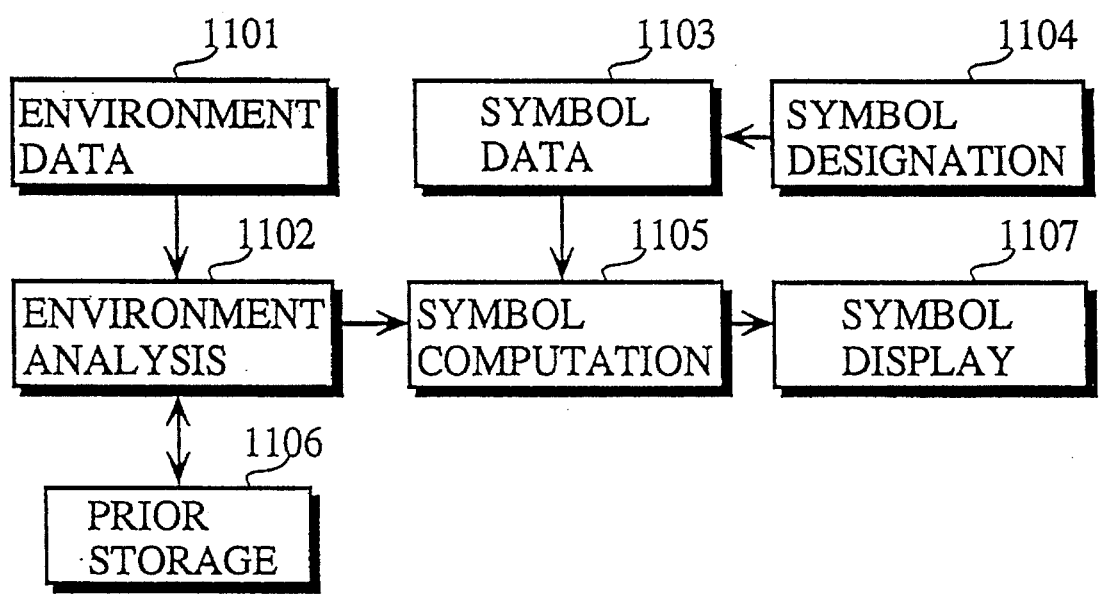
FIG. 11 is a view showing a process and data input inherent to the third embodiment.

FIG. 11 shows a process or data input necessary for this purpose.

In FIG. 11, various data relative to the environments in a room such as the size, geometry or the like of the room, location of the air conditioner, direction of the ventilation, size and location of furniture, location and illuminance of the lighting devices, size and location of windows, are inputted as environment data 1101.

Based on the environment data, internal environment condition is calculated as an environment analysis 1102.

Data relative to the change of the data relative to symbols such as soft-robot and its various expressions or the like, or the symbols in response to the physical environments of the room are inputted as symbol data 1103. To be more specific, the data related to how colors and brightness should be changed to the sensible temperatures, how the hair or strings representing hair should sway to the wind speeds, and how the expression should change to outside noise.

A designation for a location where the symbol such as the soft-robot or the like exists or locations and physical values or the like of the living environments subject to display is inputted by a keyboard, mouse or the like as a symbol designation 1104.

A symbol computation 1105 is a computation necessary to display the designated environments in the form of the symbol based on the analysis result calculated based on the input environment data and the data relative to the symbol; for example, computations necessary for the display of the sensible temperature distribution on the soft-robot, and determination or production of the soft-robot's expression corresponding to the outside noise.

A prior storage 1106 means to store in advance various conditions including thermal, optical, acoustic conditions for each point in the room calculated based on the input living environment data or the like into another memory. Accordingly, a response to various display requests from the user can be made quickly. Further in this case, illumination and air conditioning or the like are calculated by a unit of an output of the respective devices to be stored in advance; for example, the internal temperature at each point is calculated under the situation where the air conditioner's output is 500 W, 1 kW, or 1.5 kW, and the external temperature is 10° C., 5° C., 0° C., or −5° C. as the external environments. Since the affects from the soft-robots to the environment conditions are small when there are a small number of soft-robots (100 w/h people), the change of the soft-robots' locations is not reflected on the environment conditions.

A symbol computation display 1107 means to produce the content of the symbol corresponding to the result of the symbol computation in a visible form on the screen. To be more specific, the computation result of a sound strength is displayed by a value in a unit of db on the CRT, or the sensible volume may be shown by showing the expression for comfortable or uncomfortable on the soft-robot, which will be explained more in detail later.

Next, a display process for the computation result using the soft-robot will be explained with referring to FIG. 12.

Figure 12:
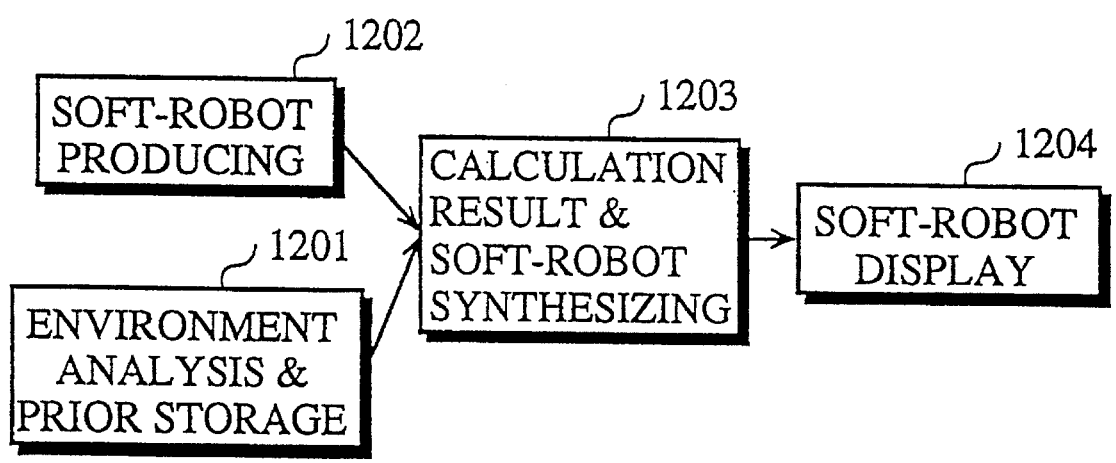
FIG. 12 is a view explaining a calculation process in the third embodiment.

As shown in FIG. 12, the process comprises environment analysis and prior storage process (1201), a soft-robot producing process (1202) where the soft robot is produced, a calculation result and soft-robot synthesizing process (1203) where the environment analysis result at the soft-robot's location is displayed on the soft-robot using the results of the steps (1201), (1202), and a soft-robot display (1204) where the result of the step (1203) is displayed.

The environment analysis and prior storage process 1201 corresponds to the environment analysis 1102 and prior storage 1106 in FIG. 11, and similarly, calculation result and the soft-robot synthesizing process 1203 corresponds to the symbol computation 1105, and soft-robot display 1204 corresponds to the symbol display 1107.

In the environment analysis, a general work station is used, and for example, the following simulation calculation will be performed.

Internal temperature distribution (steady state and unsteady state)

Traces of warm or cool air flowing from the air conditioner

Calculation of a distribution of a comfort index such as of PMV or the like

Calculation of an evaluation on internal appearance, internal illuminance and intensity distributions or the like by the lighting devices relative to the lighting environments.

Calculation of reverberation characteristics used to evaluate the chamber acoustic relative to sound environments and an evaluation on sound-insulation characteristics for the outside noise Although other methods are employed as well, the explanation thereof is omitted since they are not the gist of the present invention.

Next, the producing of the soft-robot, calculation result and soft-robot synthesizing and display of the soft-robot necessary to display the results of the various calculations by the soft-robot, which are inherent to this embodiment, will be explained more in detail with FIG 13.

Figure 13:
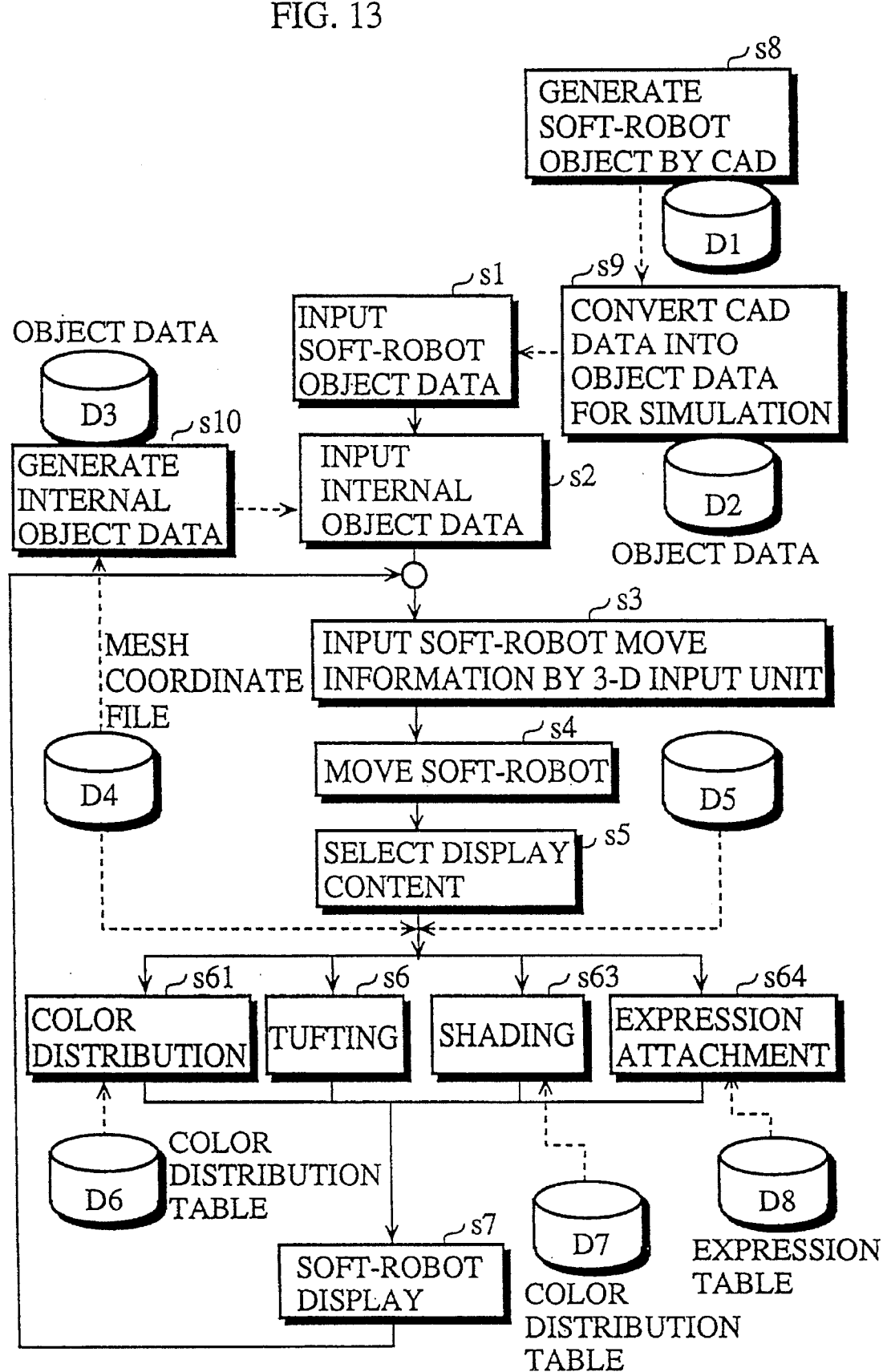
FIG. 13 is a flow of a process for the display movement relative to the soft-robot in the third embodiment.

In FIG. 13, a solid line shows the calculation flow, and a dotted line shows the data flow. Also, steps (s1)–(s4) relate to the process of the soft-robot producing, steps (s5), (s61), (s62), (s63) and (s64) relate to the process of calculation result and the soft-robot synthesizing, and (s7) relates to the calculation process of the soft-robot display.

In the soft-robot producing, soft-robot object data are inputted in the first place (s1). The soft-robot objective data (D2) are obtained by performing a soft-robot object generation by a CAD (s8) to generate CAD data (D1), which are converted into the object data for the CAD data simulation (s9).

Next, internal object data are inputted (s2). The internal object data (D3) are generated by sharing a mesh coordinate file (D4) used when performing the environment analysis simulation (s10).

Next, with respect to the change of the soft-robot's location, a moving direction of a soft-robot 120 by a 3-D input unit 1330 is inputted (s3), and subsequently, the soft-robot is moved based on the input information (s4).

In the calculation result and soft-robot synthesizing, a content of display by the soft-robot is selected (s5). Here, for example, when the temperature distribution or comfort evaluation index PMV distribution relative to the thermal environments, and illuminance distinction or intensity distribution relative to the lighting environments are selected to be displayed in a color contour, then the color distribution on the soft-robot is performed (s61); when the air circulation from the air conditioner relative to the thermal environments is evaluated, tufting is performed so that strings attached on the head of the soft-robot will sway (s2); when the shade on the face of the soft-robot relative to the lighting environments is evaluated, shades are added on the face of the soft-robot (s63); further, when the expression of the soft-robot is changed in response to the sound environments, an expression is added on the face of the soft-robot (s64). To execute the steps (s31)–(s64), the mesh coordinate file D4 must be shared with the environment analysis simulation calculation process as was with the internal object data input process in (s2), and environment analysis simulation data D5 are required.

Further, for the color distribution on the soft-robot in the step (s31), a color distribution table D6 is required; after the environment analysis simulation data at the location of the soft-robot are written in, a color value previously set by the color distribution table D6 is taken out based on the written data to put corresponding colors on each portion of the soft-robot.

Also, for the tufting of the soft-robot in the step (s62), after the environment analysis simulation data at the location of the soft-robot are written in, the strings attached to the soft-robot are swayed based on the direction and size of the circulation vector at the soft-robot's location.

To add the shade on the soft-robot's face in the step (s63), a color distribution table D7 is required; after the environment analysis simulation data at the location of the soft-robot are written in, the shades are added on the face based on the illuminance and intensity at the soft-robot's location.

Further, to add the expression on the face of the soft-robot in the step (s64), an expression table D8 is required; after the environment analysis simulation data at the location of the soft-robot are written in, an expression is selected from the expressions previously set in the expression table D8 based on the sound at that location of the soft-robot to be added on the face of the soft-robot.

Finally, to display the soft-robot, the environment analysis simulation result is displayed by the soft-robot based on the aforementioned calculations using the simulator.

Figure 14:
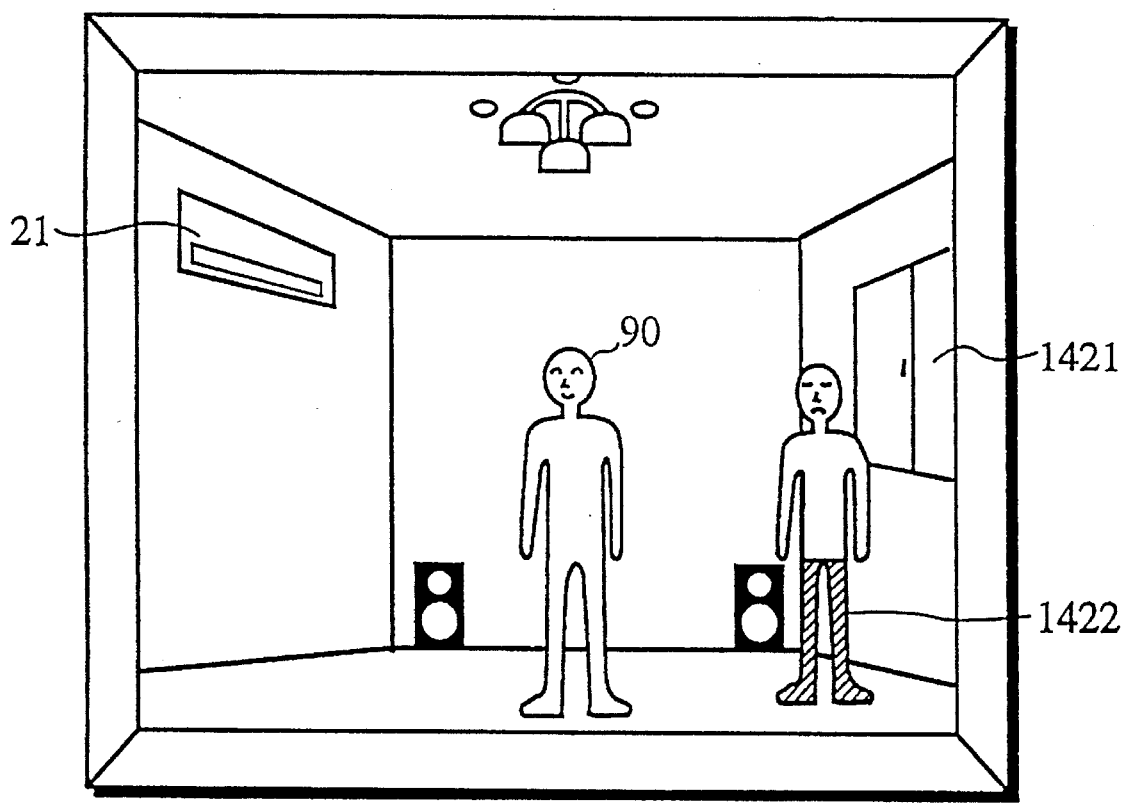
FIG. 14 is a view showing the soft-robot displaying a temperature distribution relative to people in a room in a easier way by changing the colors of its portions in the third embodiment.

FIG. 14 is a screen displaying the internal temperature distribution by the soft-robot 90. In FIG. 14, the air conditioner 21 is attached on the left wall, which is turned on to circulate warm air from the outlet at the bottom, and there is a window 1421 on the right wall opposing to the air conditioner 21. The values of the temperatures and winds in the living environments associated with the aforementioned have been calculated and stored in advance as previously explained. Assume that the output of the air conditioner is 500 W and the outside temperature is 0° C., and the soft-robot 90 walks through within the room; the soft-robot 90 moves away from the air conditioner 21, or from the center of the room to the window 1421. In this embodiment, the temperature distribution and comfort index PMV at a specific location in the room are shown by three colors on the soft-robot 90: the head, trunk, and legs. When the soft-robot 90 stands at the center of the room, the three parts of the soft-robot 90 show substantially the same bright color (white in the drawing) based on the environment data of the room, which indicates that the temperature and PMV are adequate. On the other hand, when the soft-robot stands close to the window, legs 1422 are shown darker (shaded) compared with the head and trunk, which indicate that the legs feels rather cold. This is because the warm air form the air conditioner 21 is evenly distributed at the center of the room but it does not reach to the window 1421, causing temperature difference. For this reason, the output of the air conditioner 21 is increased to 1 kW to observe the temperature distribution again, and if the result is not satisfactory, the output is increased once again. By so doing, the minimum output of the air conditioner can be found.

In this way, the internal temperature distribution can be confirmed locally, precisely, and intuitively. For this reason, the planning of the equipment necessary to regulate the temperature at a comfortable level becomes easier.

Figure 15:
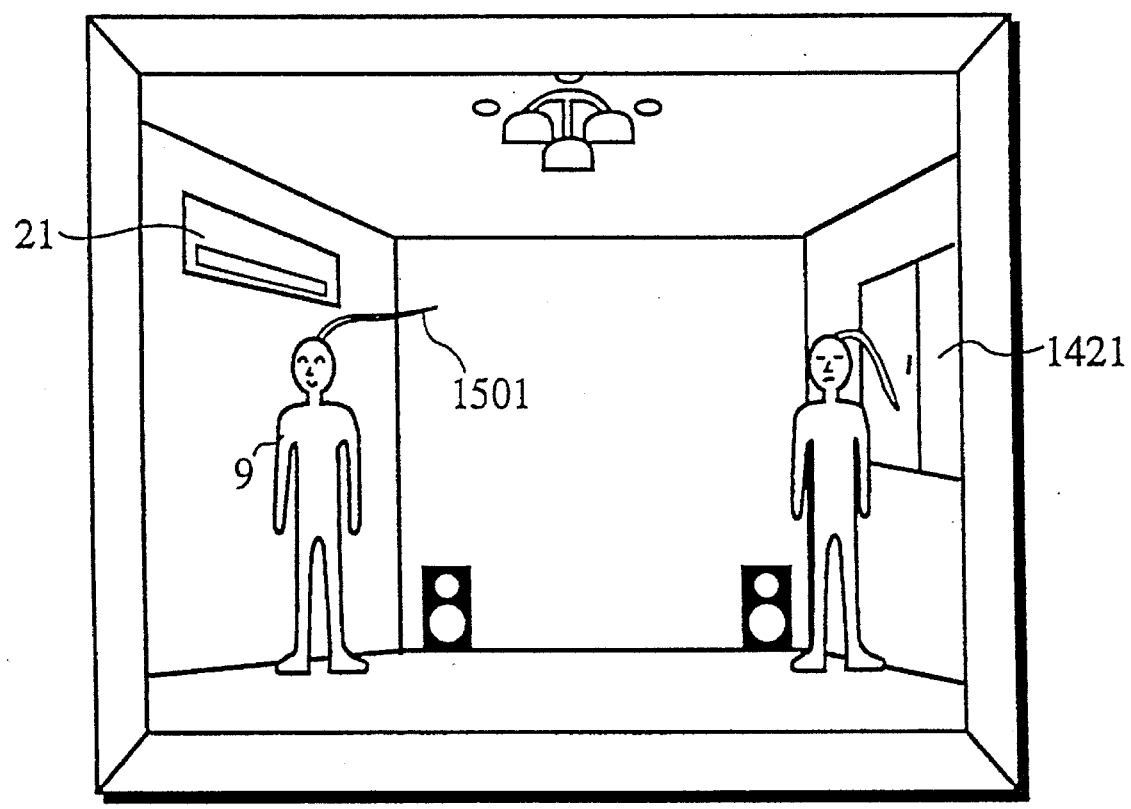
FIG. 15 is a view showing a flow of warm air from an air conditioner by a sway of strings attached on the head of the soft-robot in the third embodiment.

FIG. 15 is a screen displaying the air circulation from the air conditioner. In FIG. 15, the basic conditions are identical with those in FIG. 14 and the air conditioner 21, which is attached on the left wall, is turned on to circulate warm air from the outlet at the bottom. Also, it is identical with FIG. 14 that there is the window 1421 on the right wall opposing to the air conditioner 21. Assume that the soft-robot 90 walks through from under the outlet of the air conditioner 21 toward the window 1421 under the manipulation of the 3-D input unit 30. The soft-robot 90 is displayed with strings 1501 attached to its head that represent hair. The wind direction and wind force form the air conditioner 21 at the location of the soft-robot 90 can be known by the direction and the angle of the strings when they sway. In FIG. 15, the strings attached on the head of the soft-robot sway vigorously toward the window 1421 under the air conditioner 21, but they hardly sway near the window 1421. Thus, the air circulation caused by the air conditioner can be confirmed locally, specifically, and intuitively in relation with the soft-robot 90. Further, it is possible to observe the winds on each portion by attaching the strings to each portion. Hence, comfortable air conditioning can be easily planned using both the temperature distribution and air circulation.

Further, by coloring the soft-robot 90 in accordance with the effective temperature one would feel, which is calculated with the temperature and wind speed, a better evaluation can be obtained.

Figure 16A:
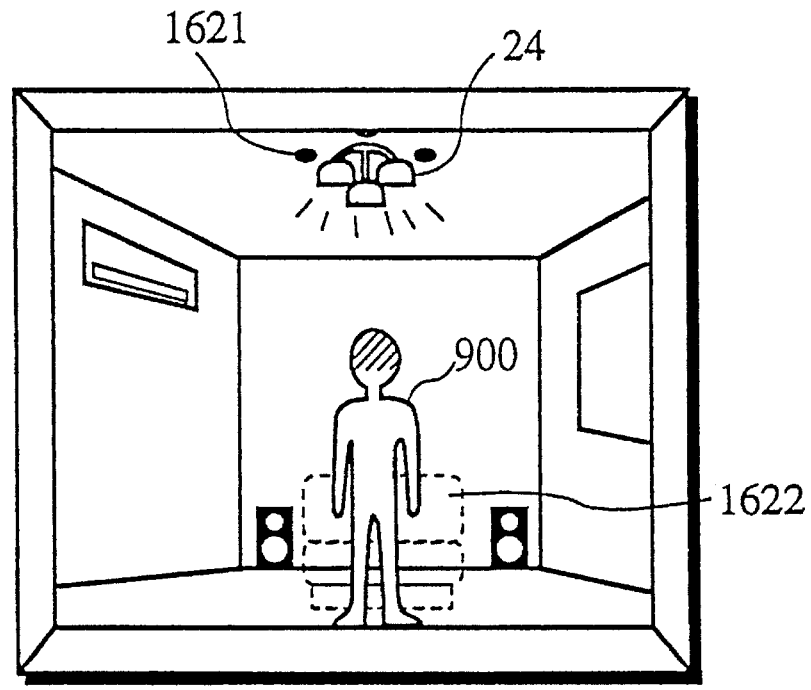
FIG. 16A is a view showing shades on the face of the soft-robot caused by an illumination by a chandelier only in the third embodiment.
Figure 16B:
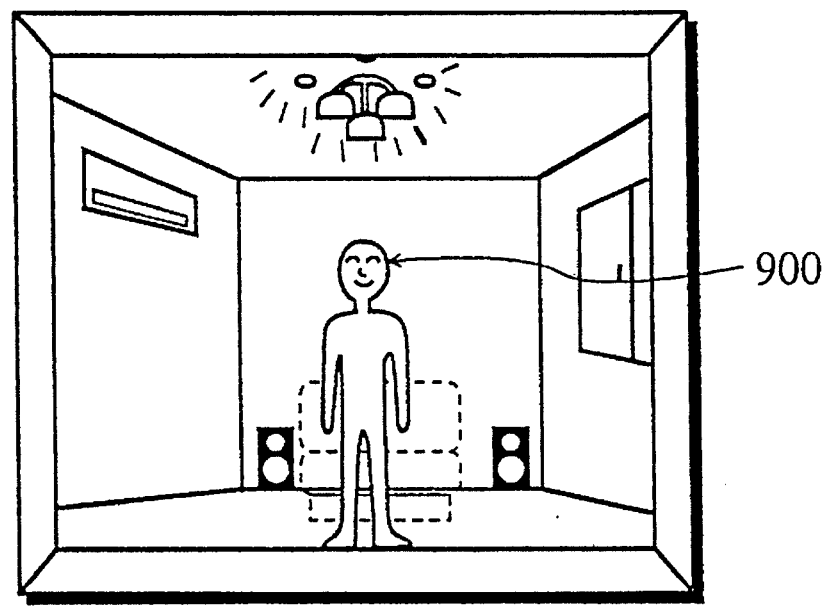
FIG. 16B is a view showing the face of the soft-robot brightly illuminated by the chandelier and spot-lights in the third embodiment.

FIGS. 16A and 16b show screens displaying the affects from the internal illumination. In FIGS. 16A and 16B, the chandelier 24 is furnished at the ceiling and four spot lights 1621 are furnished to encircle the chandelier 24. FIG. 16A shows a case where a soft-robot 900 stands at the center of the room when only the chandelier 24 is turned on. In case that only the chandelier 24 is turned on, the entire room is considerably and sufficiently bright to spend a relaxed time; however, the face of the soft-robot 900 is shadowed. In contrast, in case that both the chandelier 24 and spot lights 1621 are turned on as shown in FIG. 16B, it can be seen that the face of the soft-robot 900 is hardly shadowed. From the above, it is evaluated that the lighting environments created by the chandelier 24 is satisfactory when people chat sitting face-to-face on a sofa 1622 placed at the center of the room. However, the lighting environments created by turning on both the chandelier 24 and spot lights 1621 are more excellent in that the other people's expression can be seen clearly. In this case, although it is not shown in FIG. 16A, the user can experience a simulation in realistic lighting environments because even the shadowed face can be displayed in the goggle-type stereoscopic display unit 11. Of course only the face can be enlarged to be displayed by a specific manipulation to enable a more close observation.

Next, as to the display of the internal illuminance in this case, the illuminance per output unit (1 W) for the chandelier 24 and each spot light 1621 have been separately calculated and stored, and the illuminance from either or both of them is taken out depending on the selection of the illumination condition by the user to be used for the display of the sot-robot after a necessary amendment is added to the given output value. For this reason, it is possible to evaluate a case where only the chandelier 24 is turned on but its has a high illuminance.

Figure 17A:
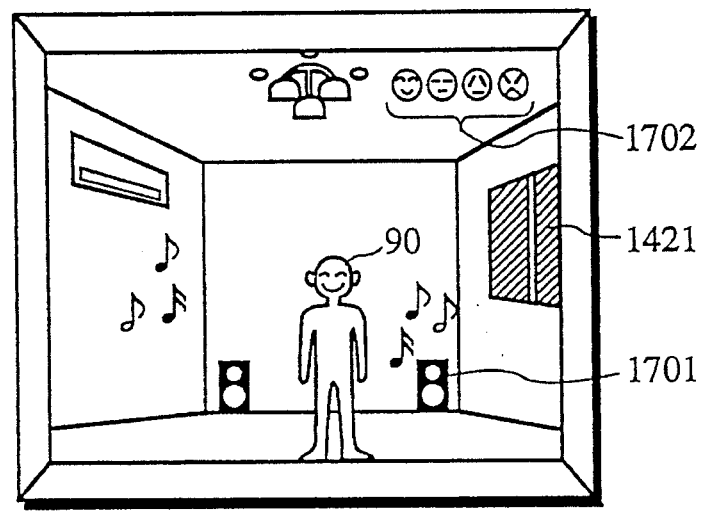
FIG. 17A is a view showing the expression of the soft-robot when a soundproof window sash is used in the third embodiment.
Figure 17B:
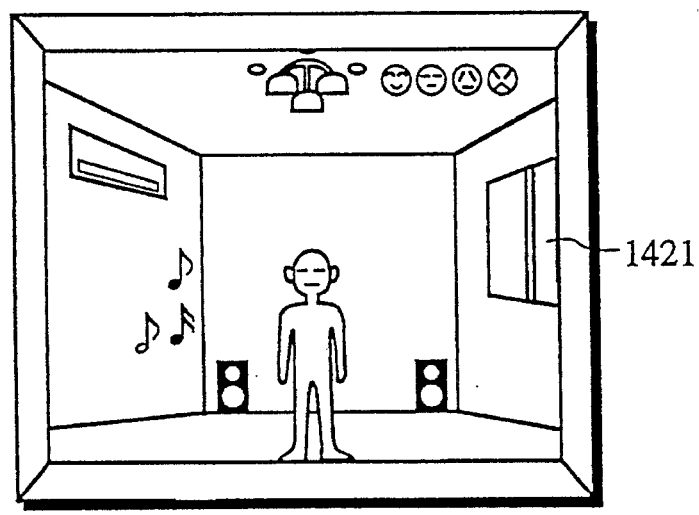
FIG. 17B is a view showing the expression of the soft-robot when a typical window is used in the third embodiment.
Figure 17C:
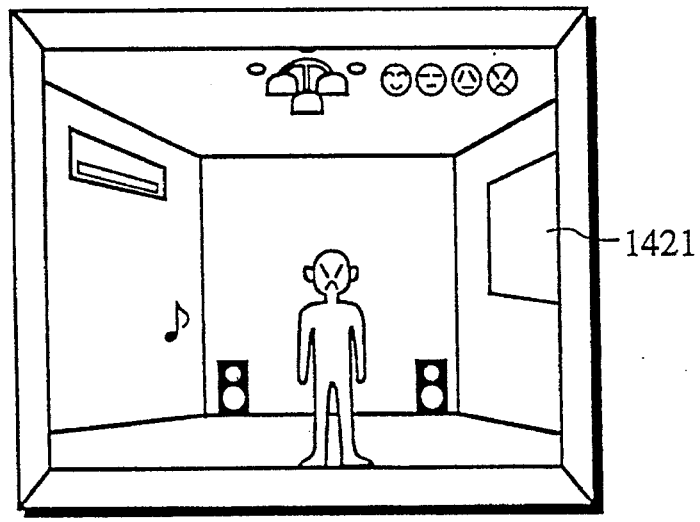
FIG. 17C is a view showing the expression of the soft-robot when a window is open in the third embodiment.

FIGS. 17A–17C show display screens used for the sound analysis. In FIG. 17, two speakers 1701 are placed on the floor in the front of the room, and the music is on. The sound environment conditions that there is the window 1421 on the right wall and there are considerable noise in the outside have been inputted in advance. In these display examples, the disturbance when one is listening to music is divided into four stages, and the expression of the soft-robot 90 varies in each stage. This is so-called a symbol display. To facilitate the understanding of the evaluation result, the expressions of the soft-robot 90 in each stage are shown at the upper right of the screen for reference. Assume that the soft-robot 90 stands at the center of the room, and evaluation result under the sound conditions to enjoy music is shown by the three cases: when a soundproof window sash with a noise insulation factor of 60 dB is closed; when a typical window with a noise insulation factor of 30 dB is closed; and when the window 1421 is opened. FIG 17A shows the case when the window 1421 is the soundproof sash window, and it shows that the noise hardly penetrate through the window, enabling one to enjoy music. FIG. 17B shows the case when the window 1421 is the typical window, and it shows that some noise disturbs one to enjoy music. FIG. 17C shows the case when the window 1421 is opened, and it shows it is almost impossible to enjoy music.

In the conventional sound environments evaluation, an observer put on a headphone or the like to listen to a reproduced sound. Thus, due to a problem with the hardware, it is difficult to listen to more than on kinds of sound at the same time to evaluate soundproof: in what degree one kind of sound is disturbed by the others. However, in this embodiment, a sensible sound environments can be evaluated. Of course, the simulator may be modified so that the user can actually experience the sound environments through his ears by putting the headphone on his both ears. In this case, the simulation experience becomes more intuitive since the visual evaluation can be obtained at the same time. Further, in the sales engineering, it is more effective to additionally display each volume of the outside noise and sound from the speakers 1701 in numerical values.

Fourth Embodiment

In the following, another embodiment of the present invention will be explained with referring to the drawings.

Although it is not limited to this embodiment, it is necessary to reflect the illuminance or the like on the display of the house or devices installed therein to experience a simulation visually. Further, in the sales engineering, the visual perception is the most important factor in effect. This embodiments relates to a simulation in various visual environments.

Figure 18:
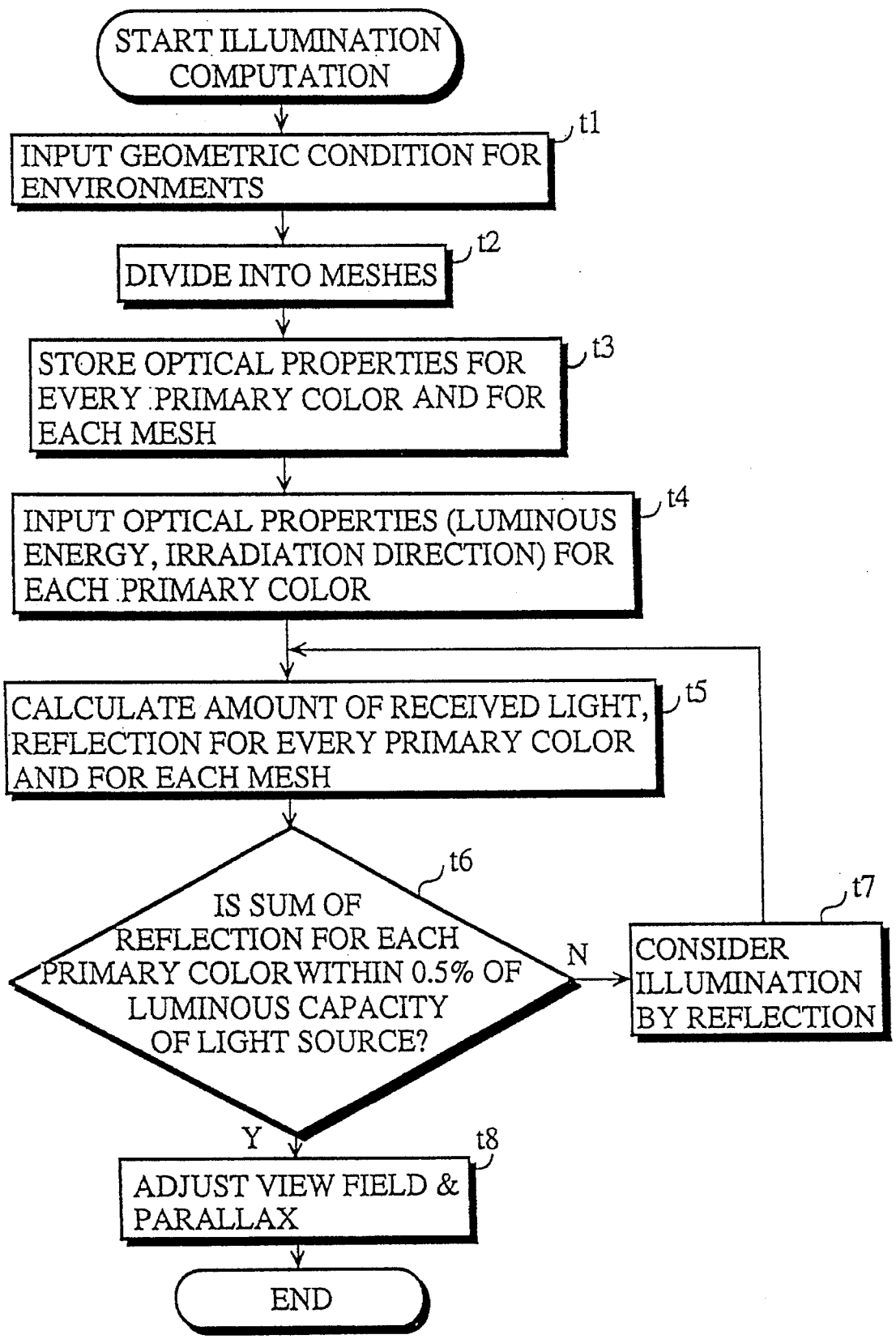
FIG. 18 is a flowchart detailing an analytic process to enable simulations of lighting and illumination environments within a room in accordance with a fourth embodiment.

In the following, a procedure, or a base of a lighting environments analysis which is a preposition of the visual simulation, will be explained with referring to the flowchart in FIG. 18. Note that this flowchart is a part of the environment analysis 1102 in FIG. 11.

Figure 19A:
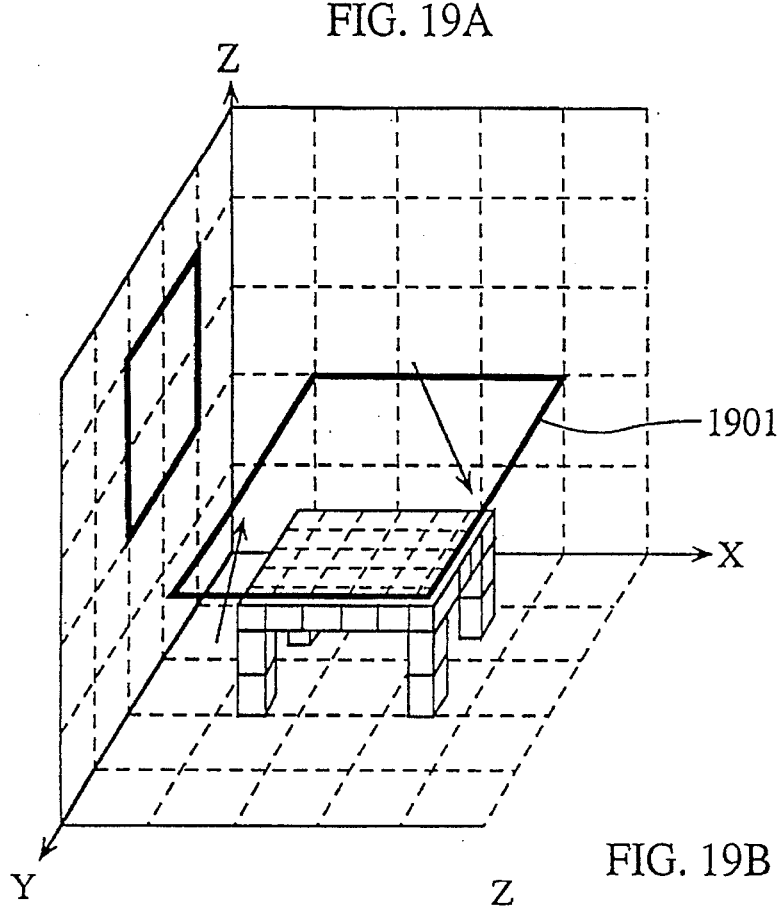
FIG. 19A is a view showing a room divided into a plurality of meshes with a virtual partition for analysis in the fourth embodiment.
Figure 19B:
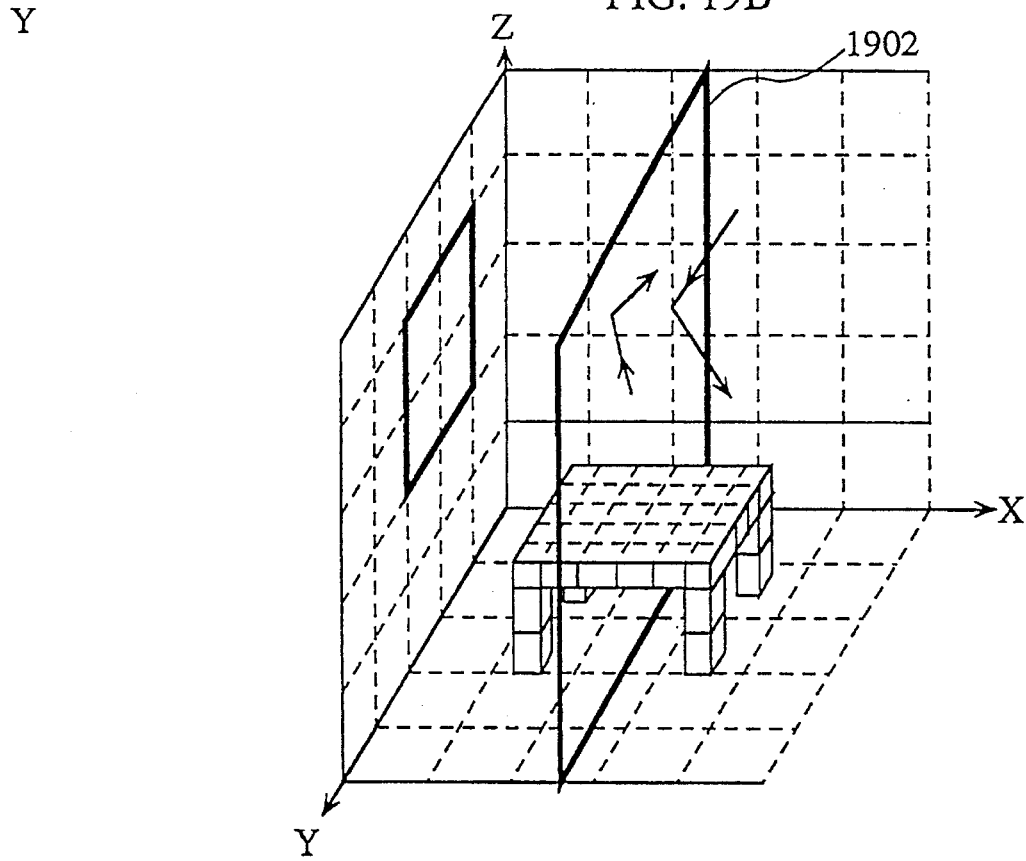
FIG. 19B is a view showing a room divided into a plurality of meshes with a virtual mirror for analysis in the fourth embodiment.

As has been stated, the optical properties such as geometry or reflection factor of the stationary walls, ceiling and floor as well as internal devices have been inputted in advance (t1). The optical properties of the outer surface of the aforementioned have been inputted in values for each of three primary colors (RGB) to be fixed. Accordingly, as shown in FIGS. 19A, 19B, the input geometry is divided into a set of meshes (t2). When necessary, a virtual partition 1901 shown in FIG. 19A or a virtual mirror 1902 shown in FIG. 19B can be inputted additionally. The former is used at an intermediate point where nothing exists, for example, when finding a brightness at the height of the eyes, and the latter is used to analyze a symmetric room efficiently. Accordingly, the input reflection factor or the like for each primary color for each mesh is set in a calculator (t3). Subsequently, the optical properties of a light source for each primary color for example the luminous energy per output unit, irradiation direction and the distribution of the luminous energy (information as to directivity) are inputted (t4). The amount of the received light and reflection on each mesh for each primary color are calculated (t5). Note that the basis of this calculation is that each mesh is assumed to be a new light source and reflects the irradiated light according to a predetermined reflection factor. Every time each mesh repeats such reflections, the luminous energy given from the original light source as an initial value will be attenuated, and such reflections are repeated until the amount of attenuation reaches to a predetermined value with respect to the initial value. The brightness of each mesh is a sum of the luminous energy released from each reflection. As to the meshes on the virtual partition, the amount of light passing through the virtual partition is the brightness. In this embodiment, whether or not the sum of the amount of reflected light for each reflection and for each primary color is within 0.5% of the initial amount of light is judged (t6). If the sum exceeds 0.5%, the reflection is reflected from the mesh to illuminate other meshes in each part of the internal room (t7). If the sum is 0.5% or less, the repetitive-calculation that the light from the original light source is repeatedly reflected at each part (each mesh) to be attenuated while contributing to the illumination on each part (each mesh) ends.

Figure 20:
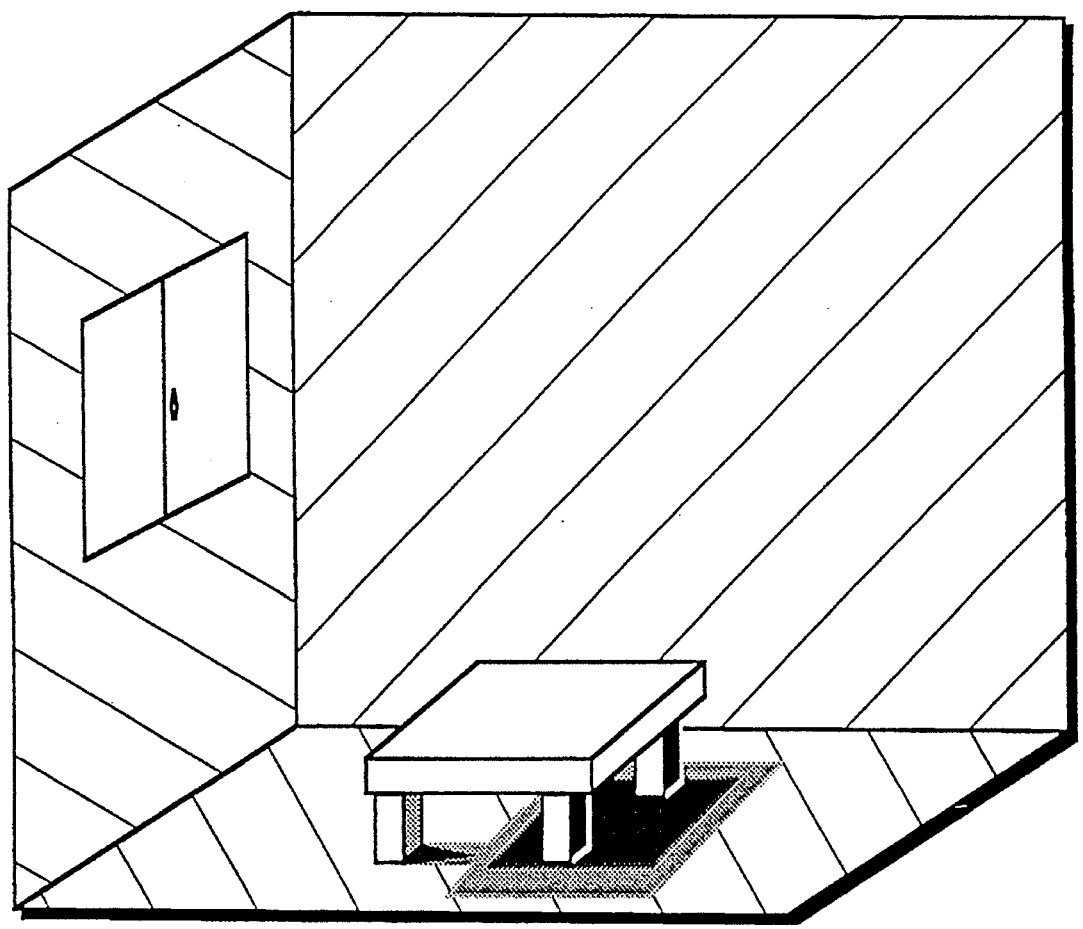
FIG. 20 is a view showing a stereoscopic display of a virtual space as the result of the analysis in the fourth embodiment.

Under these conditions, the calculation result of the lighting illumination, or the brightness for each mesh on the outer surface of each object, is written in to be shown on the display. Here, the outer surface of the object is divided roughly but to a degree not to impair the calculation accuracy to save the costs, and the each divided mesh is deemed to have the same brightness,. Note that to display the visual environments, a certain correction is performed for each pixel of the goggle-type stereoscopic display unit 11. Further, the parallax is adjusted where necessary for the stereoscopic display (t8). As a result, one can see the internal environment with realistic shade and shadow as shown in FIG. 20.

Next, the use of the virtual partition 1901 and virtual mirror 1902 will be explained as a modification of the present invention.

As shown in FIG. 19A, 100% of the incident light passes through the virtual partition 1901 while maintaining the incident direction. As shown in FIG. 19B, 100% of the incident light reflects by changing the direction in accordance with Newton's law (Fermat's principle). Glass is similar to the virtual partition, but its transmission factor is not 100%, and thus there occurs reflections in accordance with Newton's law and diffused reflections to some extent. Further, with a colored glass, the transmission factor and reflection factor or the like for each primary color vary depending on the color. In addition, unlike the virtual mirror, the reflection factor is 95% with a mirror. Thus, there also occur diffused reflections to some extent. According to the above, not only the illuminance at a given height from the floor in a space where nothing exists or namely the amount of the light or the light entering into the human eyes can be found, but also a show window using a colored glass with a multi-color light source at a shop or a hall furnished with a plurality of mirrors can be simulated visually.

Next, another modification will be explained.

In case of the simulation in the sales engineering or by users unfamiliar with the simulator, the monitor sometimes walks out of the room because of the incorrect manipulation during the walk-through. In this case, in the sales engineering particularly, if only the outside wall is visible, it is difficult for the customer to find his current location in relation with the outside view field and the house produced in the goggle-type stereoscopic display unit 11, making it difficult to walk back to the room. Accordingly, in the present invention, when the user walks out of the room, the outside wall is turned into transparent as being deemed to be the virtual partition, so that the user can find his location within the room easily to facilitate the manipulation to return to the room. Here, not only displaying the outside wall transparent, but also displaying the scenery such as the garden formed separately enables the user to look over the inside of the room from the outside. This not only facilitates the correction of the incorrect operation, but also realizes a more definite evaluation of the internal room entirely.

Of course, the external environments such as the garden may be inputted as the subject of the visual simulation to observe the external environments together with the inside of the room through the open window. Accordingly, the effects in the sales engineering increase. In this case, note that a necessary amendment for illuminance is performed to compensate the difficulty in watching caused by the brightness differences due to the open and closed windows or the brightness differences between the inside and outside of the room. More precisely, the eye sight is proportional to a logarithm of the illuminance, and lowering the outside illuminance depending on the necessity will be considered as well.

Figure 21:
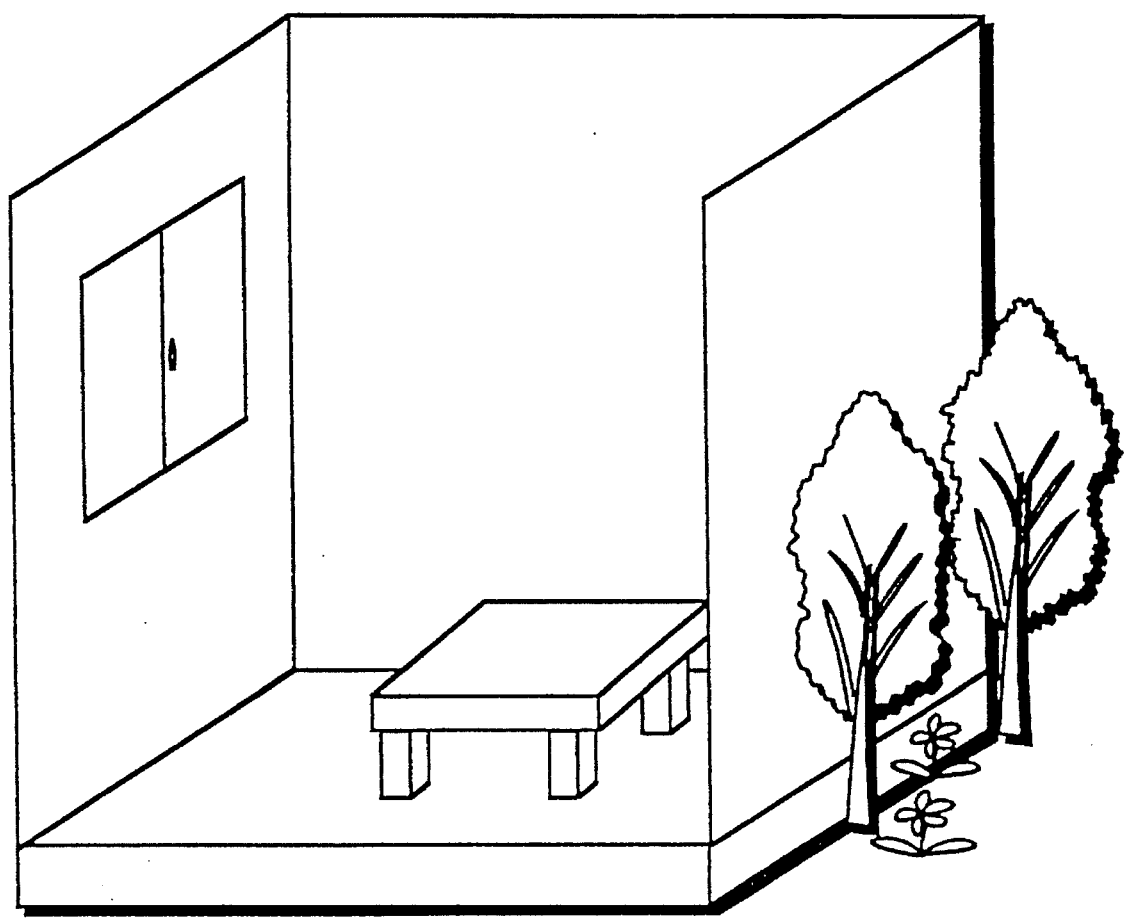
FIG. 21 is a view showing trees outside of the room with a transparent wall within the virtual space in the fourth embodiment.

FIG. 21 shows a case where the inside of a virtual house seen from the outside together with trees in the garden is displayed.

Fifth Embodiment

Next, another embodiment of the present invention will be explained.

In general, the user is interested in confirming the atmosphere created by the internal illumination or how the room appears during the walk-through hen evaluating the living environments. However, when the designers of the house or equipment use the simulator to collect intuitive planning data, it is necessary to display more detailed physical phenomenon visually. This is important, in particular, when planning the lighting environments at an art exhibition or the sound environments at a concert hall. In this embodiment, a virtual cross section is formed in the room to display a massive amount of 3-D data such as the temperature distribution by the numerical simulation thereon as scalar information such as an isothermal line to enable the designer to collect the intuitive planning data. In this case, 3-D data, vector information or the like are displayed in the form of contour lines of 2-D data, making it easy to impress the user. Also, being displayed stereoscopic, the internal environments become intuitive, making it easy to effectively reflect the display results on various designs.

Next, the basis of the data processing will be explained.

As have been stated, the temperature, wind direction and wind speed or the like at each point in the room have been calculated to be stored in the steps of the environment analysis and subsequent prior storage. For this reason, if a two-dimensional plane subject to isothermal line is fixed, of all the calculation results at each point, the closest one to the plane is taken out from the memory to link the points of the same temperature by compensation curves. Also, for example, with respect to the illuminance, the analysis value at each point of the room per output unit of the light source is stored to be easily corrected with a simple calculation depending on the output or the contents of each light source to be displayed, enabling a quick response. The illuminance at the height of 1.5 m from the floor can be found using the virtual partition which was explained in the preceding embodiment.

Figure 22:
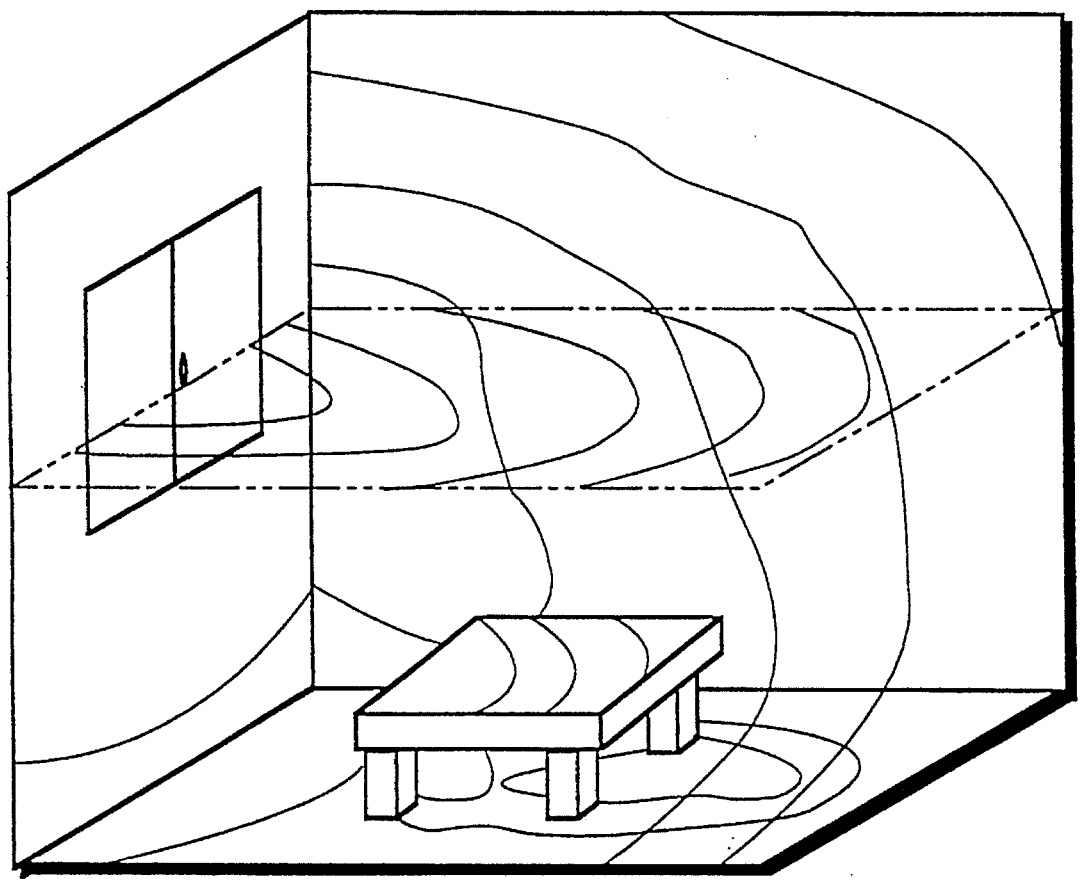
FIG. 22 is a view showing a virtual plane and a display example of contour lines of illuminance within the virtual space in a fifth embodiment.

FIG. 22 shows contour lines of the illuminance on the virtual partition and wall inside of the room.

Next, in this embodiment, it is possible to evaluate and observe the internal environments by moving or rotating the contour lines in various directions using the 3-D input unit 30. Due to the stereoscopic display, a multi-layer display is also possible of course. More precisely, a lengthwise partition placed 1 m away from the user is displayed in red, the one 2 m away in yellow, and the one 3 m away in blue, and numerical values that each couture line indicate are displayed at a regular interval or at a certain position.

Note that, in this embodiment, an unillustrated speech recognition unit may enable to move the contour line at the display position. This is done to minimize the movement of the body since the contour lines rotate while the user has covered his eyes with the goggle.

Next, the local and detailed evaluation will be explained.

As to the seats for honored guests in a hall, the user actually moves to these seats to collect detailed planning data; more precisely, it is necessary that a location subject to measurement is designated by assuming the 3-D input unit 30 as a virtual sensor to collect the detailed temperatures or the like at that designated location. Since there exist data for each coordinate for the temperature, speed, etc., they can be found either by extrapolation, or detailed calculation using the data at a close point.

Figure 23A:
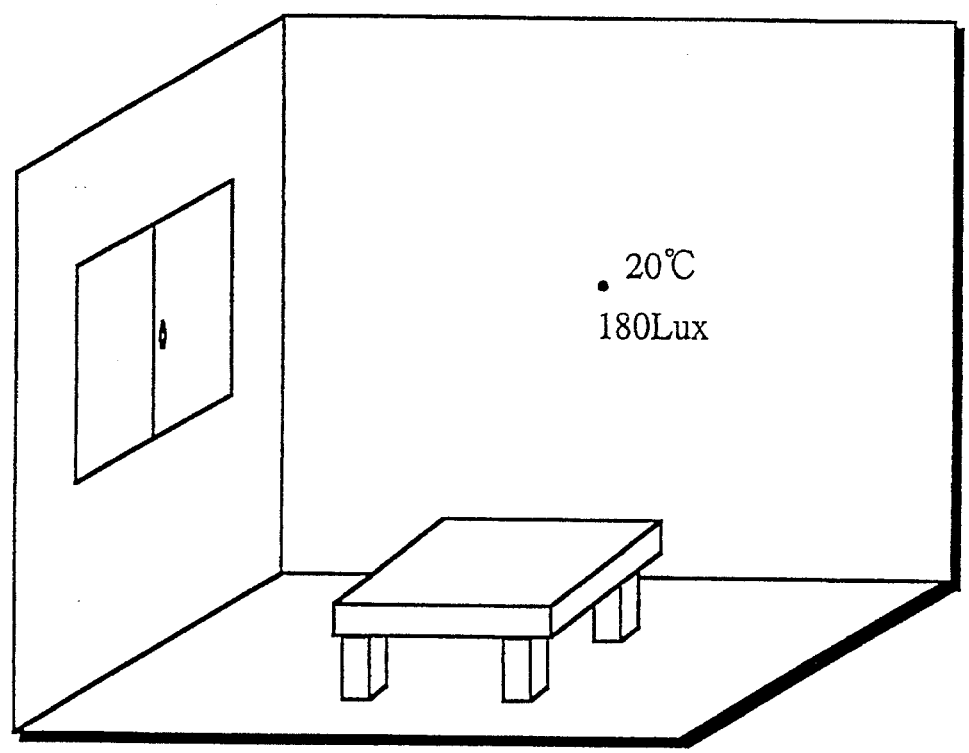
FIG. 23A is a view showing a room temperature as a physical value within the virtual space when a virtual sensor is equipped at a specific location in the fifth embodiment.
Figure 23B:
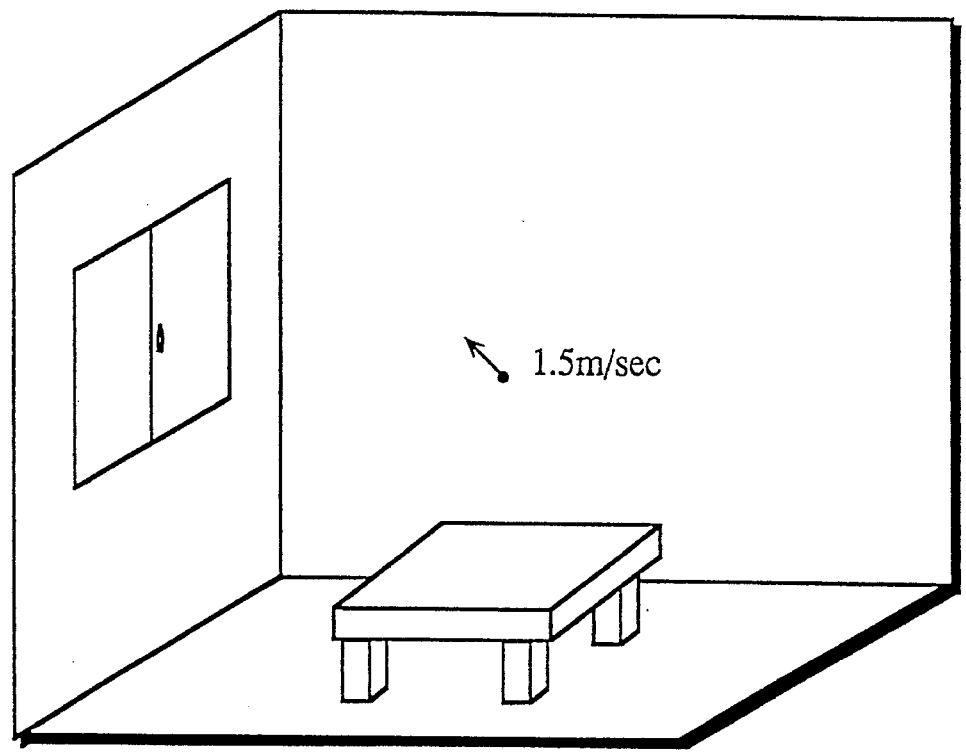
FIG. 23B is a view showing a room illuminance as a physical value within the virtual space when a virtual sensor is equipped at a specific location in the fifth embodiment.

The angle between the location of the view point and eye ray is necessary for an intensity. Thus, the angle of the 3-D input unit 30 and goggle-type stereoscopic display unit 11 are read to calculate an intensity value at that location by computation further to display the numerical value at a designated location in the goggle-type stereoscopic display unit 11 as shown in FIGS. 23A and 23B: FIG. 23A displays the temperature and illuminance in numerical values, and FIG. 23B displays the speed and direction of the wind in values and vectors.

Figure 24:
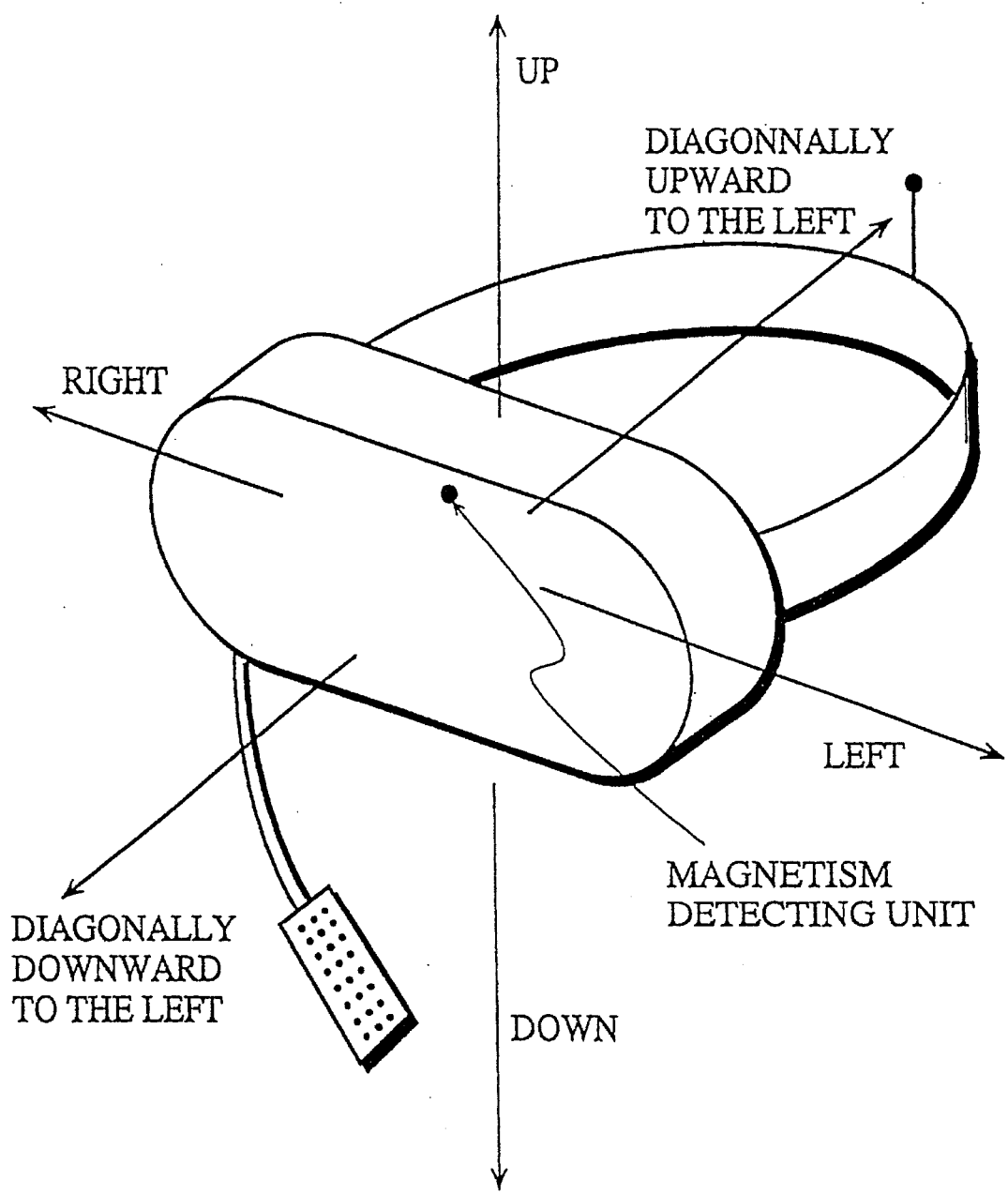
FIG. 24 is a view showing an outward appearance of a goggle-type stereoscopic display unit 11 and movements and rotation associated with its manipulation in the fifth embodiment.

In this embodiment, as shown in FIG. 3, an input unit 15 is additionally included in the goggle-type stereoscopic unit 11, so that the selection of the environment elements or time conditions can be changed by the input unit 15. This principle is shown in FIG. 24 and is as follows: magnetism detecting point or the like for each direction of 3-D (up-and-down, left-and-right, front-and-rear) is installed in the goggle-type stereoscopic display unit 11 to enable the selection and changing manipulation by the speed of the 3-D input unit to the magnetic field or gravity direction, acceleration and the directions of the aforementioned. In this case, being fixed to the head and eyes facilities the precise designation of the location.

Sixth Embodiment

This embodiment relates to the generation and display of a plurality of soft-robots.

In general, there are plurality of people in the house, shops, offices, etc. For this reason, to experience a realistic simulation visually, it is preferable to consider the existence of other people. Each behaves independently in some cases and each affects with each other in other cases. In this embodiment, any case can be simulated while the mutual affects can be analyzed as well.

Figure 25:
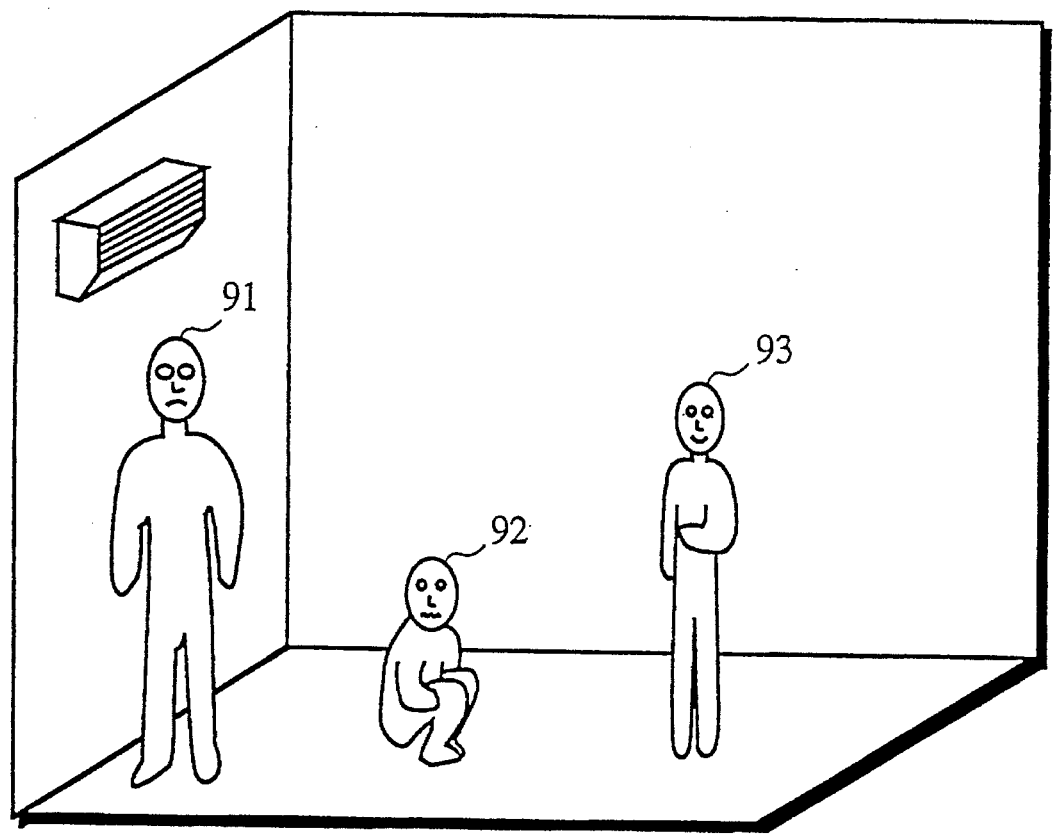
FIG. 25 is a view showing a display example when a plurality of soft-robots are walking through in a sixth embodiment.

Next, a case where three soft-robots 91, 92, 93 are shown in one of the goggle-type stereoscopic display units 11 are displayed and the principle thereof or the like will be explained based on FIG. 25. The soft-robots 91, 92, 93 in FIG. 26 correspond to their respective sets, each consisting of the corresponding goggle-type stereoscopic display unit 11, 3-D input unit 30, computation unit 13, magnetic field generating unit 14, etc. The stereoscopic display unit 11 can not only display the soft-robot 91 walking through the room in accordance with the manipulation by the 3-D input unit 30 within the corresponding set, but also display the soft-robots 92, 93 walking through the same room manipulated by other sets.

For this reason, the environment elements can be evaluated visually and objectively when the soft-robots 92, 93 manipulated by the other users walk through the room besides the sot-robot 91 manipulated by one user. It is needless to say that the soft-robots 92, 93 manipulated by the other users are displayed where the other users exist.

Figure 26:
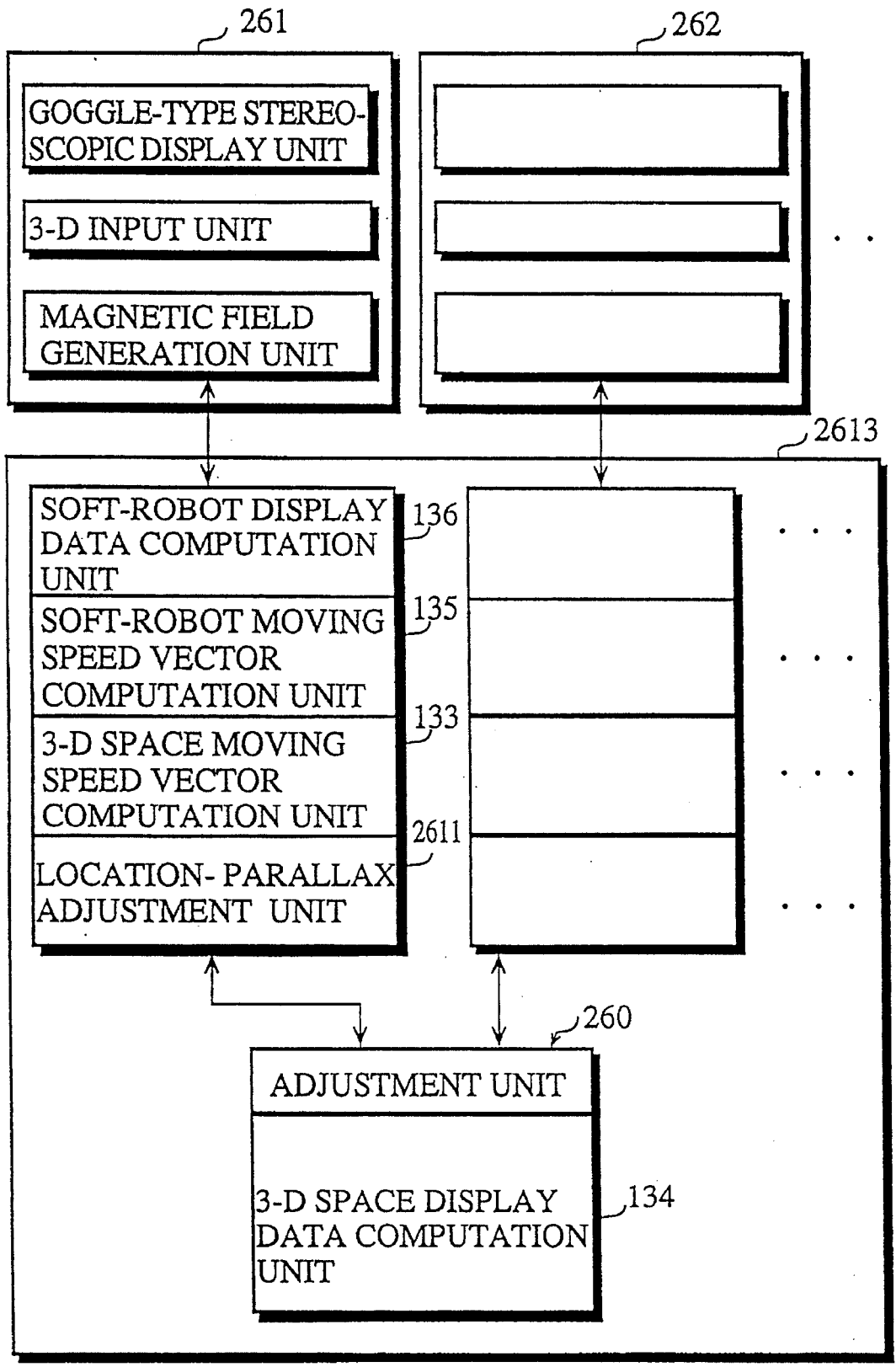
FIG. 26 is a view showing an inherent structure of a computation control unit necessary to display the plurality of soft-robots in the six embodiment.

For this reason, not only the simulation by taking into the account of other users can be experienced, but also the simulator can be used for the analysis for the behavior of people or the customers in a shop at a fire. Note that in the above cases, a program necessary to display the smoke or goods displayed at the show window is incorporated of course. In addition, various kinds of equipment necessary to make a plurality of people's behavior subject to analysis are included of course. FIG. 26 shows a structure for this purpose.

In FIG. 26, numerals 261, 262, . . . are equipment provided for each user or monitor, and each of which comprises the goggle-type stereoscopic display unit, 3-D input unit, magnetic field generation unit, and which is substantially of the same structure as the one shown in FIG. 3 except for the computation control unit 13. Numeral 2613 is a computation control unit and compared with the one shown in FIG. 3, it is different in the following points: some components are provided in a matching numbers to the users to enable the simultaneous use with a plurality of users, and a location parallax adjustment unit 2611 is additionally included. In other words, there are a plurality of the soft-robot display data computation units 136, sot-robot moving speed vector computation units 135, and 3-D space moving speed vector computation units 133 in a matching number to the users.

An adjustment unit 260 to adjust inconsistent requests from each user is additionally included.

On the other hand, the computation unit 134 that calculates the common internal environments or the like is common.

The adjustment unit 260 adjusts the inconsistent requests from each user, so that a plurality of the soft-robots 91, 92, 93 will not be displayed at a single location, and also it sends information as the location of each user to a location-parallax adjustment unit 2611 in each set. The location-parallax adjustment unit 2611 adds amendments according to the location or the like of each user when the internal environments calculated by the 3-D space display data computation unit 134 is created in the goggle-type stereoscopic display unit 11 for each user. As well, it receives data to generate the soft-robots corresponding to other users from the adjustment unit 260 while sending information of its user.

Next, another application and using method of this embodiment will be explained.

In house sales, when the customer experience the housing environments of the subject house or the like, the customer is not familiar with the contents of the simulation and manipulations of the 3-D input unit 30, and the experience often ends unsatisfactory. Thus, the sales man of the constructing company or the sales company puts on the goggle-type stereoscopic display unit 11 to experience the same virtual housing environments that the customer is experiencing to help the manipulation and simulation. This may increase the effects in selling the houses besides the simulation. Accordingly, the user of simulators by making a pair of the customer and sales man is realized. In this case, two soft-robots 91, 92 respectively corresponding to the customer and sales man may be displayed, or a virtual space or the like created based on the customer's sight or intention may be displayed in the goggle-type stereoscopic display unit 11 that the sales man is putting on. In the latter case, sales man's location-parallax adjustment unit 2611, soft-robot display data computation unit 136 or the like will not be operated, and a video signal or the like for the customer's simulation is divided by two to be supplied to both the goggle-type stereoscopic display units 11. In any case, the manipulation or adjustment of the sales man's 3-D input unit 30 is switched upon the consent by verbal communication where necessary.

The present invention has been explained based on the embodiments but it is not limited to these embodiments. For example, it can be modified as follows:

(1) The 3-D space is not limited to the internal space, any 3-D space which can be subject to simulation such as inside of air craft, outside theater, jungle, the North or South Pole, outer space, or the Mediterranean Sea is applicable. "Internal" referred herein includes any point with the 3-D space, and "house" or "device" means a kind of the 3-D space, the content, or various condition generating elements existing inside thereof. To be more specific, a plain in the Mesozoic era where dinosaurs exist can be simulated just for fun. In this case, the user may watch the dinosaurs, or the view in the Mesozoic era seen through the eyes of the dinosaurs. Further, the goggle-type stereoscopic display unit may generate a world seen through the eyes of the reptiles or insects.

(2) The physical data to be evaluated are not limited to the computer simulation result, and experimental measurement result may be reflected as well. In this case, the measurement result has been inputted in advance of course. The experiment measurement is, or example, smoke used to analyze people's behavior at a fire by the simulator of the six embodiment.

(3) The 3-D input unit is to be manipulated by one hand but to be held by both hands, so that rough operation or command is inputted by left hand and detailed command is inputted by the right hand. Another input unit may be additionally used. Particularly in the sales engineering, the sales man sets a complex condition by another manipulation unit to simplify the 3-D input unit for the customer. Also, typical words such as "stop" may be input verbally while the customer walks through the room.

(4) The 3-D input unit to be manipulated by hands and the one attached at the head were explained; however, they do not necessarily have the same function. In other words, main functions are given to the one at hand, and the one at the head may be used for changing the virtual internal space in accordance with the movement of the head or neck and for designating the direction of the walk-through. This would be more practical for the customer's simulation in the sales engineering.

(5) A stereo headphone may be included so that noise caused by the operation of a washing machine, air conditioner, etc. can be simulated.

(6) The 3-D unit may not be of the configuration of the trigger of the pistol; it may be of the configuration of the barrel such that includes a lengthy bar to obtain manual directivity of the 3-D beams.

(7) A CRT and a CPU or the like may be additionally included, so that a third party can refer to the display on the CRT on a desk to analyze or change the virtual housing environments created for the monitor's sight, operation by the monitors, or the simulation contents. This would be effective in analyzing the people's behavior at emergency or the like.

(8) The detection or the like for the change of the rotation angle of the 3-D input unit may depend on only the gravity. A supersonic wave or an ultra-red rays or the like may be used with a corresponding costs and complexity. This would further enables a precise input manipulation.

(9) When a plurality of people put on the goggle-type stereoscopic display units, the same internal environments may be created in each of them. The video of the internal space corresponding to the eye ray position depending on the shaking of the head or direction may be constructed. Accordingly, one sales man can attend a plurality of customers, so that they can experience the simulation of the subject house visually.

(10) In case that the environments such as the coffee houses or dance halls are simulated, a function to generate a plurality of soft-roots that do not correspond to any of the monitors may be additionally furnished. In this case, the amount of heat (60–100 W/h people) is assumed to increase proportional to the number of the soft-robots, and the thermal conditions are analyzed. The wind direction or the like may be neglected, analyzed, or discussed separately depending on the conditions.

(11) When selecting the menu, the menu may be encircled by an additional specific color frame.

(12) The manipulation guidance of the 3-D input unit may be displayed within the view field in the goggle-type stereoscopic unit for the customer or unfamiliar people.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A simulator system for providing a virtual environment for a user, comprising:

viewing means to provide images of a virtual environmental for the user's eyes;

input means for inputting data to create images for the user's eyes through the viewing means including physical conditions of the virtual environment at predetermined locations in the virtual environment; and control means to enable the user to interact with the virtual environment images including:

means for creating a variable symbol in the virtual environment, controlling movement of the symbol through the virtual environment and cause the symbol to visually change in appearance in response to the physical condition data at the predetermined locations, to thereby convey information visually to the user.

2. A simulator for producing an environment visually in accordance with a user's manipulation, said simulator comprising:

stereoscopic viewing means to be put on said user's eyes;

input means for inputting necessary data to produce an environment of an interior where an evaluation for a user experience depends on properties of primary colors, wherein virtual experience is achieved by visually expressing differences in atmosphere using differences between each primary color prior to a simulation;

storage means for storing data inputted by said input means;

selective lighting condition numerical data input means for inputting numerical data related to at least one of an illuminance of lighting for each primary color, a transmission factor of a glass surface for each primary color, and a reflection factor of a mirror to evaluate lighting environment condition data for an environment of an interior where an evaluation for a user experience depends on properties of primary colors, said numerical data being selected by said user, said lighting environment condition data corresponding to data stored in said storage means;

selective lighting condition numerical data storage means for storing said numerical data inputted by said selective lighting condition data input means;

selection manipulating means for enabling said user to select necessary data for a lighting environment evaluation from said numerical data stored in said selective lighting condition numerical data storage means; and stereoscopic environment producing-storing means for producing said lighting environment condition data for an environment of an interior where an evaluation for a user experience depends on properties of primary colors by calculating for each primary color, based on said data stored in said storage means and said numerical data selected by said selection manipulating means, for storing said lighting environment condition data and for having said lighting environment condition data displayed in said stereoscopic viewing means.

3. The simulator of claim 2, further comprising:

soft-robot producing means for producing a soft-robot within said environment;

soft-robot's location designating means for enabling said user to designate and amend a location of said soft-robot within said environment;

soft-robot display control means used for lighting environment condition data evaluation for reflecting said lighting environment condition data on a display of said soft-robot at a location designated by said soft-robot's location designating means.

4. The simulator of claim 3, wherein said soft-robot's location designation manipulating mean includes:

a detecting unit for detecting at least one of an manipulation causing a magnetic change, a manipulation causing an acceleration, a button pushing manipulation, and a switching manipulation by a movement of one hand of said user; and a detection manipulation converting unit for converting a detection content by said detecting unit into designation and amendment commands related to said soft-robot's location from said user.

5. The simulator of claim 4, further comprising:

soft-robot's color designation manipulating means for enabling said user to designate and change a color of at least a part of said soft-robot under luminescent light to store said color;

color-designated soft-robot display control means for controlling said soft-robot display control means to display said color-designated soft-robot by reflecting said lighting environment condition data at a location of said soft-robot.

6. The simulator of claim 4, further comprising:

soft-robot's color designation manipulating means for enabling said user to designate and change a color of at least a part of said soft-robot under luminescent light to store said color;

color-designated soft-robot display control means for controlling said soft-robot display control means to display said color-designated soft-robot by reflecting said lighting environment condition data at a location of said soft-robot.

7. The simulator of claim 3, further comprising:

soft-robot's color designation manipulating means for enabling said user to designate and change a color of at least a part of said soft-robot under luminescent light to store said color;

color-designated soft-robot display control means for controlling said soft-robot display control means to display said color-designated soft-robot by reflecting said lighting environment condition data at a location of said soft-robot.

8. A simulator for producing an environment for simulation visually in accordance with a user's manipulation, said simulator comprising:

stereoscopic viewing means to be put on said user's eyes;

input means for inputting necessary data to produce an environment subject to visual simulation prior to a simulation;

storage means for storing data inputted by said input means;

stereoscopic environment producing means for producing an environment in said stereoscopic viewing means based data stored in said storage means;

soft-robot producing means for producing a soft-robot within said environment;

soft-robot's location designating means for enabling said user to designate and amend a location of said soft-robot within said environment;

physical condition data input means for inputting data necessary to determine a physical condition within said environment, said physical condition data corresponding to data stored in said storage means;

physical condition data storage means for storing said data inputted by said physical condition data input means;

physical condition data calculating-storing means for calculating a value representing said physical condition data related to a location of said soft-robot within said environment designated by said soft-robot's location designating means using at least a part of said physical condition data stored in said physical condition data storage means to store a calculation result;

soft-robot display rule input means for inputting a rule that regulates a relation between said value and a soft-robot display manner prior to producing of said soft-robot;

soft-robot display rule storage means for storing said rule inputted by said soft-robot display rule input means;

soft-robot display manner determining means for determining a soft-robot display manner based on a calculation result stored in said physical condition data calculating-storing means and said rule stored in said soft-robot display rule storage means; and soft-robot display manner control means for controlling said stereoscopic viewing means to display said soft-robot in accordance with a manner determined by said soft-robot display manner determining means by synthesizing said soft-robot and said environment.

9. The simulator of claim 8, further comprising physical condition data change manipulating means for enabling user to change at least a part of data stored in said physical condition data storage means used for a calculation of said physical condition data at a location of said soft-robot into at least one of other data and new input data; and physical condition data change manipulation effecting means for effecting, when said user effects said change using said physical condition data change manipulating means, an amending operation necessary for a calculation, determination, synthesis and display associated with said change to said physical condition data storing means, said soft-robot display manner determining means, and said soft-robot display manner control means.

10. The simulator of claim 9, wherein said soft-robot's location designating means includes:

a detecting unit for detecting at least one of an manipulation causing a magnetic change, a manipulation causing an acceleration, a button pushing manipulation, and a switching manipulation by a movement of said user's one hand; and a detection manipulation converting unit for converting a detection result of said detecting unit into designation and amendment commands related to said soft-robot's location.

11. The simulator of claim 10, wherein said soft-robot's location designating means further includes:

a speech input unit for accepting a speech input from said user; and a verbal command converting unit for converting said speech accepted by said speech input unit into the designation and amendment commands related to said soft-robot's location.

12. The simulator of claim 11, wherein said physical condition data input means includes:

an air-circulation condition data input unit for inputting data that determines a condition related to an air circulation, and wherein said physical condition data calculating-storing means includes:

a wind-direction and wind-speed distribution calculating-storing unit for calculating a wind direction and wind speed distribution within said one environment to store a calculating result, and wherein said soft-robot display rule input means includes:

a string's sway rule input unit for inputting a relation between a direction and a manner of a sway of a string in accordance with a direction and a speed of a wind, said string being attached to at least one point on said soft-robot, and wherein said soft-robot display manner determining means includes:

a string display determining unit for determining a display manner of said string based on said relation inputted by said string's sway rule input unit as a determined soft-robot display manner.

13. The simulator of claim 11, wherein said physical condition data input means includes:

an illuminance condition data input unit for inputting data that determine a condition related to illuminance within said environment, and wherein said physical condition data calculating-storing means includes:

an illuminance calculating-storing unit for calculating illuminance within said one environment to store a calculation result, and wherein said soft-robot display rule input means includes:

a face display rule input unit for inputting a content for at least one of an expression and shades on said soft-robot's face in accordance with an illuminance on the face, and wherein said soft-robot display manner determining means includes:

a face display determining unit for determining at least one of the expression and shades on said soft-robot's face in accordance with the illuminance on the face to be displayed.

14. The simulator of claim 1, wherein said physical condition data input means includes:

a sound condition data input unit for inputting a condition related to sound within said environment, and said physical condition data calculating-storing means includes:

a sound strength calculating-storing unit for calculating a sound strength from a predetermined sound source to store a calculation result, and wherein said soft-robot display rule input means includes:

a volume display rule input unit for inputting a content of a sound display to be attached on said soft-robot in accordance with a sound strength arriving at said soft-robot's ears, and wherein said soft-robot display manner determining means includes:

a volume display determining unit for varying a volume display in accordance with a volume arriving at said soft-robot's ears to be displayed.

15. The simulator of claim 11, wherein said physical condition data input means includes:

a temperature condition data input unit for inputting data that determine a condition related to at least one of a temperature and an effective temperature within said environment, and wherein said physical condition data calculating-storing means includes:

a temperature calculating-storing unit for calculating one of the temperature and effective temperature within said environment to store a calculation result, and wherein said soft-robot display rule input means includes:

a color rule input unit for inputting a content of a color to be attached on at least one predetermined point on said soft-robot in accordance with one of the temperature and effective temperature at said one predetermined point, and wherein said soft-robot display manner determining means includes:

a color display determining unit for determining to attach a color on said predetermined point in accordance with one of the temperature and the effective temperature at said one predetermined point to be displayed.

16. The simulator of claim 10, wherein said physical condition data input means includes:

an air-circulation condition data input unit for inputting data that determines a condition related to an air circulation, and wherein said physical condition data calculating-storing means includes:

a wind-direction and wind-speed distribution calculating-storing unit for calculating a wind direction and wind speed distribution within said one environment to store a calculating result, and wherein said soft-robot display rule input means includes:

a string's sway rule input unit for inputting a relation between a direction and a manner of a sway of a string in accordance with a direction and a speed of a wind, said string being attached to at least one point on said soft-robot, and wherein said soft-robot display manner determining means includes:

a string display determining unit for determining a display manner of said string based on said relation inputted by said string's sway rule input unit as a determined soft-robot display manner.

17. The simulator of claim 10, wherein said physical condition data input means includes:

an illuminance condition data input unit for inputting data that determine a condition related to illuminance within said environment, and wherein said physical condition data calculating-storing means includes:

an illuminance calculating-storing unit for calculating illuminance within said one environment to store a calculation result, and wherein said soft-robot display rule input means includes:

a face display rule input unit for inputting a content for at least one of an expression and shades on said soft-robot's face in accordance with an illuminance on the face, and wherein said soft-robot display manner determining means includes:

a face display determining unit for determining at least one of the expression and shades on said soft-robot's face in accordance with the illuminance on the face to be displayed.

18. The simulator of claim 10, wherein said physical condition data input means includes:

a sound condition data input unit for inputting a condition related to sound within said environment, and said physical condition data calculating-storing means includes:

a sound strength calculating-storing unit for calculating a sound strength from a predetermined sound source to store a calculation result, and wherein said soft-robot display rule input means includes:

a volume display rule input unit for inputting a content of a sound display to be attached on said soft-robot in accordance with a sound strength arriving at said soft-robot's ears, and wherein said soft-robot display manner determining means includes:

a volume display determining unit for varying a volume display in accordance with a volume arriving at said soft-robot's ears to be displayed.

19. The simulator of claim 10, wherein said physical condition data input means includes:

a temperature condition data input unit for inputting data that determine a condition related to at least one of a temperature and an effective temperature within said environment, and wherein said physical condition data calculating-storing means includes;

a temperature calculating-storing unit for calculating one of the temperature and effective temperature within said environment to store a calculation result, and wherein said soft-robot display rule input means includes:

a color rule input unit for inputting a content of a color to be attached on at least one predetermined point on said soft-robot in accordance with one of the temperature and effective temperature at said one predetermined point, and wherein said soft-robot display manner determining means includes:

a color display determining unit for determining to attach a color on said predetermined point in accordance with one of the temperature and the effective temperature at said one predetermined point to be displayed.

20. The simulator of claim 9, wherein said physical condition data input means includes:

an air-circulation condition data input unit for inputting data that determines a condition related to an air circulation, and wherein said physical condition data calculating-storing means includes:

a wind-direction and wind-speed distribution calculating-storing unit for calculating a wind direction and wind speed distribution within said one environment to store a calculating result, and wherein said soft-robot display rule input means includes:

a string's sway rule input unit for inputting a relation between a direction and a manner of a sway of a string in accordance with a direction and a speed of a wind, said string being attached to at least one point on said soft-robot, and wherein said soft-robot display manner determining means includes:

a string display determining unit for determining a display manner of said string based on said relation inputted by said string's sway rule input unit as a determined soft-robot display manner.

21. The simulator of claim 9, wherein said physical condition data input means includes:

an illuminance condition data input unit for inputting data that determine a condition related to illuminance within said environment, and wherein said physical condition data calculating-storing means includes:

an illuminance calculating-storing unit for calculating illuminance within said one environment to store a calculation result, and wherein said soft-robot display rule input means includes:

a face display rule input unit for inputting a content for at least one of an expression and shades on said soft-robot's face in accordance with an illuminance on the face, and wherein said soft-robot display manner determining means includes:

a face display determining unit for determining at least one of the expression and shades on said soft-robot's face in accordance with the illuminance on the face to be displayed.

22. The simulator of claim 9, wherein:

said physical condition data input means includes:

a sound condition data input unit for inputting a condition related to sound within said environment, and said physical condition data calculating-storing means includes:

a sound strength calculating-storing unit for calculating a sound strength from a predetermined sound source to store a calculation result, and wherein said soft-robot display rule input means includes:

a volume display rule input unit for inputting a content of a sound display to be attached on said soft-robot in accordance with a sound strength arriving at said soft-robot's ears, and wherein said soft-robot display manner determining means includes:

a volume display determining unit for varying a volume display in accordance with a volume arriving at said soft-robot's ears to be displayed.

23. The simulator of claim 9, wherein said physical condition data input means includes:

a temperature condition data input unit for inputting data that determine a condition related to at least one of a temperature and an effective temperature within said environment, and wherein said physical condition data calculating-storing means includes;

a temperature calculating-storing unit for calculating one of the temperature and effective temperature within said environment to store a calculation result, and wherein said soft-robot display rule input means includes:

a color rule input unit for inputting a content of a color to be attached on at least one predetermined point on said soft-robot in accordance with one of the temperature and effective temperature at said one predetermined point, and wherein said soft-robot display manner determining means includes:

a color display determining unit for determining to attach a color on said predetermined point in accordance with one of the temperature and the effective temperature at said one predetermined point to be displayed.

24. A simulator of claim 8, wherein said physical condition data input means includes:

an air-circulation condition data input unit for inputting data that determines a condition related to an air circulation, and wherein said physical condition data calculating-storing means includes:

a wind-direction and wind-speed distribution calculating-storing unit for calculating a wind direction and wind speed distribution within said one environment to storm a calculating result, and wherein said soft-robot display rule input means includes:

a string's sway rule input unit for inputting a relation between a direction and a manner of a sway of a string in accordance with a direction and a speed of a wind, said string being attached to at least one point on said soft-robot, and wherein said soft-robot display manner determining means includes:

a string display determining unit for determining a display manner of said string based on said relation inputted by said string's sway rule input unit as a determined soft-robot display manner.

25. The simulator of claim 8, wherein said physical condition data input means includes:

an illuminance condition data input unit for inputting data that determine a condition related to illuminance within said environment, and wherein said physical condition data calculating-storing means includes:

an illuminance calculating-storing unit for calculating illuminance within said one environment to store a calculation result, and wherein said soft-robot display rule input means includes:

a face display rule input unit for inputting a content for at least one of an expression and shades on said soft-robot's face in accordance with an illuminance on the face, and wherein said soft-robot display manner determining means includes:

a face display determining unit for determining at least one of the expression and shades on said soft-robot's face in accordance with the illuminance on the face to be displayed.

26. The simulator of claim 8, wherein said physical condition data input means includes:

a sound condition data input unit for inputting a condition related to sound within said environment, and said physical condition data calculating-storing means includes:

a sound strength calculating-storing unit for calculating a sound strength from a predetermined sound source to store a calculation result, and wherein said soft-robot display rule input means includes:

a volume display rule input unit for inputting a content of a sound display to be attached on said soft-robot in accordance with a sound strength arriving at said soft-robot's ears, and wherein said soft-robot display manner determining means includes:

a volume display determining unit for varying a volume display in accordance with a volume arriving at said soft-robot's ears to be displayed.

27. The simulator of claim 8, wherein said physical condition data input means includes:

a temperature condition data input unit for inputting data that determine a condition related to at least one of a temperature and an effective temperature within said environment, and wherein said physical condition data calculating-storing means includes;

a temperature calculating-storing unit for calculating one of the temperature and effective temperature within said environment to store a calculation result, and wherein said soft-robot display rule input means includes:

a color rule input unit for inputting a content of a color to be attached on at least one predetermined point on said soft-robot in accordance with one of the temperature and effective temperature at said one predetermined point, and wherein said soft-robot display manner determining means includes:

a color display determining unit for determining to attach a color on said predetermined point in accordance with one of the temperature and the effective temperature at said one predetermined point to be displayed.

28. A simulator for producing an environment for simulation visually in accordance with a user's manipulation, said simulator comprising:

stereoscopic viewing means to be put on said user's eyes;

input means for inputting necessary data to produce an environment subject to visual simulation prior to a simulation;

storage means for storing data inputted by said input means;

stereoscopic environment producing means for producing an environment in said stereoscopic viewing means based data stored in said storage means;

symbol producing means for producing a symbol within said environment, said symbol indicating a value representing a physical condition within said environment visually;

symbol's location designating means for enabling said user to designate and change a location of said symbol within said environment;

physical condition data input means for inputting data necessary to determine a physical condition within said environment, said physical condition data corresponding to data stored in said storage means;

physical condition data storage means for storing said data inputted by said physical condition data input means;

physical condition data calculating-storing means for calculating a value representing said physical condition at a location of said symbol designated by said symbol location designating means using at least a part of data stored in said physical condition data storage means to store a calculation result;

symbol display rule input means for inputting a rule that determines a relation between said value representing said physical condition at said symbol's designated location and a display manner;

symbol display rule storage means for storing said rule inputted by said symbol display rule input means;

symbol display manner determining means for determining a display manner of said symbol based on said calculation result stored in said physical condition data calculating-storing means and said rule stored in said symbol display rule storage means; and symbol display manner control means for displaying said symbol in a manner determined by said symbol display manner determining means by synthesizing said symbol and said one environment.

29. The simulator of claim 28, further comprising:

physical condition data change manipulating means for changing at least a part of data used for a calculation of said physical condition at said symbol's location within said environment into at least one of other data and newly input data, said part of data being stored in said physical condition data storing means; and physical condition data change manipulation effecting means for effecting, when said user effects said change using said physical condition data change manipulating means, an amendment operation necessary for a calculation, determination, synthesis, and display in accordance with said change to said physical condition data calculating-storing means, said symbol display manner determine display, and said symbol display manner control means.

30. The simulator of claim 29, wherein said symbol's location designating means includes:

a detecting unit for detecting at least one of an manipulation causing a magnetic change, a manipulation causing an acceleration, a button pushing manipulation, and a switching manipulation by a movement of one hand of said user; and a detection manipulation converting unit for converting a detection content by said detecting unit into designation and amendment commands related to said symbol's location from said user.

31. The simulator of claim 30, wherein said symbol's location designating means further includes:

a speech input unit for accepting a speech of said user;

a verbal command converting unit for converting said speech accepted by said speech input unit into the designation and amendment commands related to said symbol's location.

32. The simulator of claim 31, wherein said symbol display rule input means includes:

a numerical value display rule input means for inputting a rule to display a numerical value representing a physical value as a rule determining a relation between said physical value of said environment and a symbol's display manner.

33. The simulator of claim 30, wherein said symbol display rule input means includes:

a numerical value display rule input means for inputting a rule to display a numerical value representing a physical value as a rule determining a relation between said physical value of said environment and a symbol's display manner.

34. A simulator for producing an environment for simulation visually in accordance with a user's manipulation, said simulator comprising;

stereoscopic viewing means to be put on said user's eyes;

input means for inputting necessary data to produce an environment subject to visual simulation prior to a simulation;

storage means for storing data inputted by said input means;

user's location input manipulating means for enabling said user to designate and amend said user's location within said environment;

stereoscopic environment producing means for producing said environment within said stereoscopic viewing means in accordance with a location of said user inputted by said user's location input manipulating means based on data stored in said storage means;

boundary recognizing means for recognizing a boundary of said environment based on data stored in said storage means;

outside-boundary-user recognizing means for recognizing a current location of said user based in an input by said user's location input manipulating means to detect a case when said user walks out of said environment based on said boundary, and for subsequently finding a relation between a latest location of said user within said environment and a current location outside of said environment; and outside-boundary-user guiding means for producing information, upon a receipt of a notice of said relation from said outside-boundary-user recognizing means, related to said relation in said stereoscopic viewing means by referring to data stored in said storage means.

35. The simulator of claim 34, wherein said user's location input manipulating means includes:

a detecting unit for detecting at least one of an manipulation causing a magnetic change, a manipulation causing an acceleration, a button pushing manipulation, and a switching manipulation by a movement of one hand of said user; and a detection manipulation converting unit for converting a detection content by said detecting unit into designation and amendment commands related to said user's location from said user.

36. The simulator of claim 35, wherein said outside-boundary-user guiding means includes:

a view-through-transparent-wall producing means for producing a view seen from said user's current location outside of said environment through a wall erected between said user's current location and said latest location within said environment by making said wall transparent.

37. The simulator of claim 34, wherein said outside-boundary-user guiding means includes:

a view-through-transparent-wall producing means for producing a view seen from said user's current location outside of said environment through a wall erected between said user's current location and said latest location within said environment by making said wall transparent.

38. A simulator for producing an environment for simulation visually in accordance with a user's manipulation, said simulator comprising:

stereoscopic viewing means to be put on said user's eyes;

input means for inputting necessary data to produce an environment subject to visual simulation prior to a simulation;

storage means for storing data inputted by said input means;

stereoscopic environment producing means for producing said environment within said stereoscopic viewing means based data stored in said storage means;

physical condition data input means for inputting data necessary to determine a physical condition within said environment, said physical condition data corresponding to data stored in said storage means;

physical condition data storage means for storing said physical condition data inputted from said physical condition data input means;

physical condition distribution calculating-storing means for calculating a distribution of said physical condition based on data inputted from said physical condition data input means to store a calculation result;

virtual plane setting manipulating means for setting at least one virtual plane within said environment at a command from said user; and contour line map drawing means for drawing a contour line map of said physical condition data within said one environment on said virtual plane based on said physical condition distribution, and for synthesizing said contour line map and said environment to display a result in said stereoscopic viewing means.

39. The simulator of claim 38, further comprising:

detecting means for detecting at least one of an manipulation causing a magnetic change, a manipulation causing an acceleration, a button pushing manipulation, and a switching manipulation by a movement of one hand of said user; and virtual plane amending command converting means for converting a detection result by said detecting means into a command related to a change of one of a location and a direction of said virtual plane from said user; and virtual plane setting amending means for amending one of the location and direction of said virtual plane based on a converting result by said virtual plane amending command converting means.

40. The simulator of claim 39, wherein said virtual plain setting means includes:

a plural-virtual-plains setting unit for setting more than one virtual plain, and wherein said contour line map drawing means includes:

a colore contour line map displaying unit for coloring each contour line map in different colors to be displayed stereoscopically when said plural-virtual-plains setting unit sets a plurality of said virtual plains.

41. The simulator of claim 40, wherein said physical condition data input means includes:

an illuminance condition data input unit for inputting data related to illuminance as data necessary to determine said physical condition, and wherein said physical condition distribution calculating-storing means includes:

an illuminance distribution calculating-storing unit for calculating an illuminance distribution within said environment as said physical condition distribution to store a calculation result, and wherein said contour line map drawing means includes, an illuminance contour line map drawing unit for displaying an illuminance contour line map on said virtual plane.

42. The simulator of claim 40, wherein said physical condition data input means includes:

a temperature condition data input unit for inputting data related to a temperature as data necessary to determine said physical condition, and wherein said physical condition distribution calculating-storing means includes:

a temperature distribution calculating-storing unit for calculating a temperature distribution as said physical condition distribution to store a calculation result, and wherein said contour line map drawing means includes:

a temperature contour line map drawing unit for drawing a temperature contour line map on said virtual plane.

43. The simulator of claim 40, wherein said physical condition data input means includes:

a sound condition data input unit for inputting at least one of a predetermined quality sound and a sound from a sound source as data necessary to determine said physical condition, and wherein said physical condition distribution calculating-storing means includes:

a sound distribution calculating-storing unit for calculating at least one of said predetermined quality sound and said sound from said sound source as said physical condition distribution to store a calculation result, and wherein said contour line map drawing means includes:

a sound contour line map drawing unit for drawing a sound contour line map on said virtual plane for display.

44. The simulator of claim 39, wherein said physical condition data input means includes:

an illuminance condition data input unit for inputting data related to illuminance as data necessary to determine said physical condition, and wherein said physical condition distribution calculating-storing means includes:

an illuminance distribution calculating-storing unit for calculating an illuminance distribution within said environment as said physical condition distribution to store a calculation result, and wherein said contour line map drawing means includes, an illuminance contour line map drawing unit for displaying an illuminance contour line map on said virtual plane.

45. The simulator of claim 39, wherein said physical condition data input means includes:

a temperature condition data input unit for inputting data related to a temperature as data necessary to determine said physical condition, and wherein said physical condition distribution calculating-storing means includes:

a temperature distribution calculating-storing unit for calculating a temperature distribution as said physical condition distribution to store a calculation result, and wherein said contour line map drawing means includes:

a temperature contour line map drawing unit for drawing a temperature contour line map on said virtual plane.

46. The simulator of claim 39, wherein said physical condition data input means includes:

a sound condition data input unit for inputting at least one of a predetermined quality sound and a sound from a sound source as data necessary to determine said physical condition, and wherein said physical condition distribution calculating-storing means includes:

a sound distribution calculating-storing unit for calculating at least one of said predetermined quality sound and said sound from said sound source as said physical condition distribution to store a calculation result, and wherein said contour line map drawing means includes:

a sound contour line map drawing unit for drawing a sound contour line map on said virtual plane for display.

47. The simulator of claim 38, wherein said physical condition data input means includes:

an illuminance condition data input unit for inputting data related to illuminance as data necessary to determine said physical condition, and wherein said physical condition distribution calculating-storing means includes:

an illuminance distribution calculating-storing unit for calculating an illuminance distribution within said environment as said physical condition distribution to store a calculation result, and wherein said contour line map drawing means includes, an illuminance contour line map drawing unit for displaying an illuminance contour line map on said virtual plain.

48. The simulator of claim 38, wherein said physical condition data input means includes:

a temperature condition data input unit for inputting data related to a temperature as data necessary to determine said physical condition, and wherein said physical condition distribution calculating-storing means includes:

a temperature distribution calculating-storing unit for calculating a temperature distribution as said physical condition distribution to store a calculation result, and wherein said contour line map drawing means includes:

a temperature contour line map drawing unit for drawing a temperature contour line map on said virtual plain.

49. The simulator of claim 38, wherein said physical condition data input means includes:

a sound condition data input unit for inputting at least one of a predetermined quality sound and a sound from a sound source as data necessary to determine said physical condition, and wherein said physical condition distribution calculating-storing means includes:

a sound distribution calculating-storing unit for calculating at least one of said predetermined quality sound and said sound from said sound source as said physical condition distribution to store a calculation result, and wherein said contour line map drawing means includes:

a sound contour line map drawing unit for drawing a sound contour line map on said virtual plane for display.

50. A simulator for producing an environment for simulation visually for a plurality of users in accordance with their manipulations, said simulator comprising:

stereoscopic viewing means to be put on each user's eyes;

input means for inputting necessary data to produce an of environment subject to visual simulation prior to a simulation;

storage means for storing data inputted by said input means;

each user's location designating mean for enabling each user to designate and amend their own locations within said environment;

individual user's environment producing means for producing a view field of said environment determined by data stored in said storage means and each user's location within their respective stereoscopic viewing means;

user's location recognizing means for recognizing a location of each user experiencing the simulation based on input from said individual user's location designating means; and other users' soft-robots producing means for producing soft-robots corresponding to other users respectively at their respective locations based on a recognition result by said user's location recognition means within said environment.

51. The simulator of claim 50, wherein said individual user's location input means includes:

a detecting unit for detecting at least one of an manipulation causing a magnetic change, a manipulation causing an acceleration, a button pushing manipulation, and a switching manipulation by a movement of one hand of each user; and a detection manipulation converting unit for converting a detection content by said detecting unit into designation and amendment commands related to said user's location from each user.

52. The simulator of claim 51, wherein the input means includes a fire data input unit for receiving an input of data concerning generation of smoke and flames in a fire;

the storage means includes a fire data storage unit for storing data inputted into the first data input unit; and the individual user's environment producing means includes a fire data reflected environment producing unit which, in producing each user's environment, also reflects the data stored in the fire data storage unit.

53. The simulator of claim 50, wherein the input means includes a fire data input unit for receiving an input of data concerning generation of smoke and flames in a fire;

the storage means includes a fire data storage unit for storing data inputted into the first data input unit; and the individual user's environment producing means includes a fire data reflected environment producing unit which, in producing each user's environment, also reflects the data stored in the fire data storage unit.

54. A simulator for producing an environment for simulation visually in accordance with a user's manipulation, said simulator comprising:

stereoscopic viewing means to be put on said user's eyes;

input means for inputting necessary data to produce an environment subject to visual simulation prior to a simulation;

soft-robot producing means for producing a soft-robot within said environment;

soft-robot's location designating means for enabling said user to designate and amend a location of said soft-robot within said environment;

storage means for storing data inputted by said input means;

selective lighting condition numerical data input means for inputting numerical data related to at least one of an illuminance of lighting for each primary color, a transmission factor of a glass surface for each primary color, and a reflection factor of a mirror to evaluate lighting environment condition data, said numerical data being selected by said user, said lighting environment condition data corresponding to data stored in said storage means;

selective lighting condition numerical data storage means for storing said numerical data inputted by said selective lighting condition data input means;

selection manipulating means for enabling said user to select necessary data for a lighting environment evaluation from said numerical data stored in said selective lighting condition numerical data storage means;

stereoscopic environment producing-storing means for producing said lighting environment condition data based on said data stored in said storage means and said numerical data selected by said selection manipulating means to store said lighting environment condition data and to be displayed in said stereoscopic viewing means; and soft-robot display control means used for lighting environment condition data evaluation for reflecting said lighting environment condition data on a display of said soft-robot at a location designated by said soft-robot's location designating means.

55. The simulator of claim 54, wherein said soft-robot's location designation manipulating means includes:

a detecting unit for detecting at least one of a manipulation causing a magnetic change, a manipulation causing an acceleration, a button-pushing manipulation, and a switching manipulation by a movement of one hand of said user; and a detection manipulation converting unit for converting a detection content by said detecting unit into designation and amendment commands related to said soft-robot's location from said user.

56. The simulator of claim 55, further comprising:

soft-robot's color designation manipulating means for enabling said user to designate and change a color of at least a part of said soft-robot under luminescent light to store said color; and color-designated soft-robot display control means for controlling said soft-robot display control means to display said color-designated soft-robot by reflecting said lighting environment condition data at a location of said soft-robot.

57. The simulator of claim 55, further comprising:

soft-robot's color designation manipulating means for enabling said user to designate and change a color of at least a part of said soft-robot under luminescent light to store said color; and color-designated soft-robot display control means for controlling said soft-robot display control means to display said color-designated soft-robot by reflecting said lighting environment condition data at a location of said soft-robot.

58. The simulator of claim 54, further comprising:

soft-robot's color designation manipulating means for enabling said user to designate and change a color of at least a part of said soft-robot under luminescent light to store said color; and color-designated soft-robot display control means for controlling said soft-robot display control means to display said color-designated soft-robot by reflecting said lighting environment condition data at a location of said soft-robot.

* * * * *